United States Patent [19]

Ikedo

[11] Patent Number: 5,808,624
[45] Date of Patent: Sep. 15, 1998

[54] PICTURE MAKING APPARATUS FOR CREATING A PICTURE FOR PRINTING BY ASSEMBLING AND POSITIONING COMPONENT PARTS

[75] Inventor: Tatsuhiro Ikedo, Nagoya, Japan

[73] Assignee: Brother Kogyo Kabushiki Kaisha, Nagoya, Japan

[21] Appl. No.: 507,924

[22] Filed: Jul. 27, 1995

[30] Foreign Application Priority Data

| Jul. 29, 1994 | [JP] | Japan | 6-179275 |
| Jul. 29, 1994 | [JP] | Japan | 6-179276 |
| Jul. 29, 1994 | [JP] | Japan | 6-179277 |
| Jul. 29, 1994 | [JP] | Japan | 6-179278 |
| Jul. 29, 1994 | [JP] | Japan | 6-179279 |
| Jul. 29, 1994 | [JP] | Japan | 6-179280 |

[51] Int. Cl.⁶ ........................... G06T 11/00
[52] U.S. Cl. ........................... 345/435
[58] Field of Search .................. 395/133, 135, 395/139; 345/433–435

[56] References Cited

U.S. PATENT DOCUMENTS

| 5,542,037 | 7/1996 | Sato et al. | 395/135 |
| 5,588,096 | 12/1996 | Sato et al. | 395/135 |

FOREIGN PATENT DOCUMENTS

| 584759 | 2/1994 | European Pat. Off. . |
| 57-156952 | 10/1982 | Japan . |
| 4-338877 | 11/1992 | Japan . |

*Primary Examiner*—Almis R. Jankus
*Attorney, Agent, or Firm*—Oliff & Berridge, PLC

[57] ABSTRACT

A montage picture making apparatus having a storage device for storing a plurality of patterns for respective parts of a face, a designator for designating occupation areas of respective parts on the screen, a device for selecting a desired pattern of each a plurality of desired parts from the storage device, a device for deciding the display size of a pattern so that the pattern of a selected part can be adapted to the occupation area of the part in a predetermined state; and a display for displaying the pattern in an occupation area determined for the part with the decided display size.

26 Claims, 51 Drawing Sheets

Fig.4 A  STANDARD
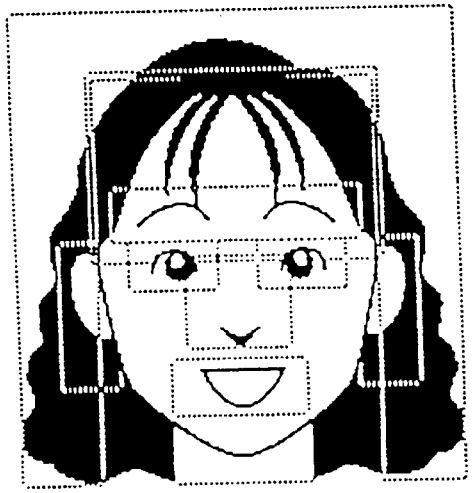
Fig.4 B  THICK
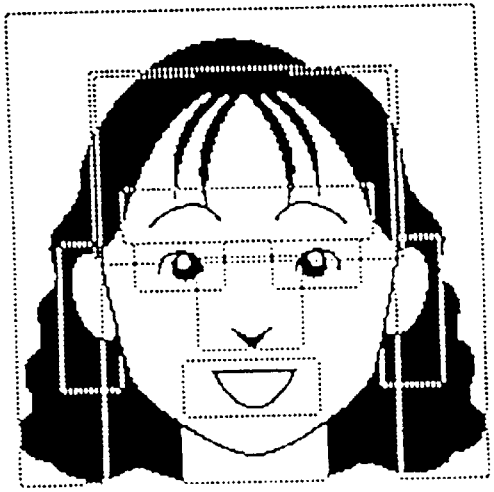
Fig.4 C  THIN
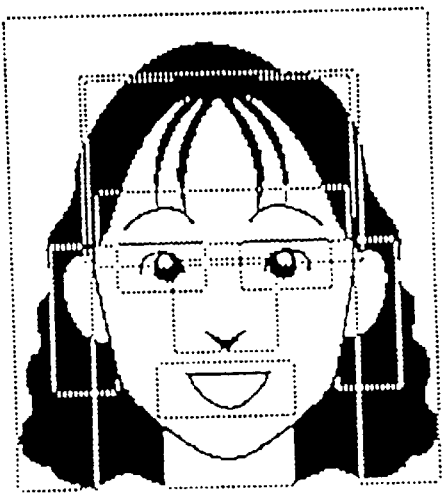
Fig.4 D  CHILD
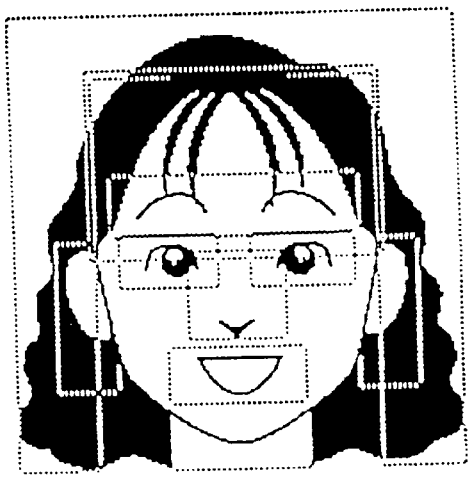

Fig. 6B

| STEP | ACTION |
|---|---|
| S5 | ACQUISITION/SETTING OF MONTAGE DATA OF THE PRECEDING TIME |
| S10 | MONTAGE PICTURE PLOTTING PROCESS |
| S15 | TAKE-IN OF MOUSE/KEY INPUT |
| S20 | INITIALIZATION ? |
| S25 | INITIALIZATION CHANGING PROCESS |
| S30 | STYLE? |
| S35 | STYLE SELECTING PROCESS |
| S40 | PART? |
| S45 | PART SELECTING PROCESS |
| S50 | PART SIZE? |
| S55 | PART SIZE CHANGING PROCESS |
| S60 | LINKAGE? |
| S65 | LEFT-RIGHT LINKAGE MODE SETTING PROCESS |

Fig. 7B

| STEP | ACTION |
|---|---|
| S70 | PATTERN ? |
| S75 | PATTERN SELECTING PROCESS |
| S80 | PART MOVEMENT ? |
| S85 | PART MOVING PROCESS |
| S90 | OK ? |
| S95 | MONTAGE PICTURE DECISIONAL PROCESS |
| S100 | OUTPUT PICTURE PLOTTING PROCESS |
| S110 | OK ? |
| S120 | SCALING PROCESS |
| S130 | OUTPUT DATA REGISTERING PROCESS |
|  | END |

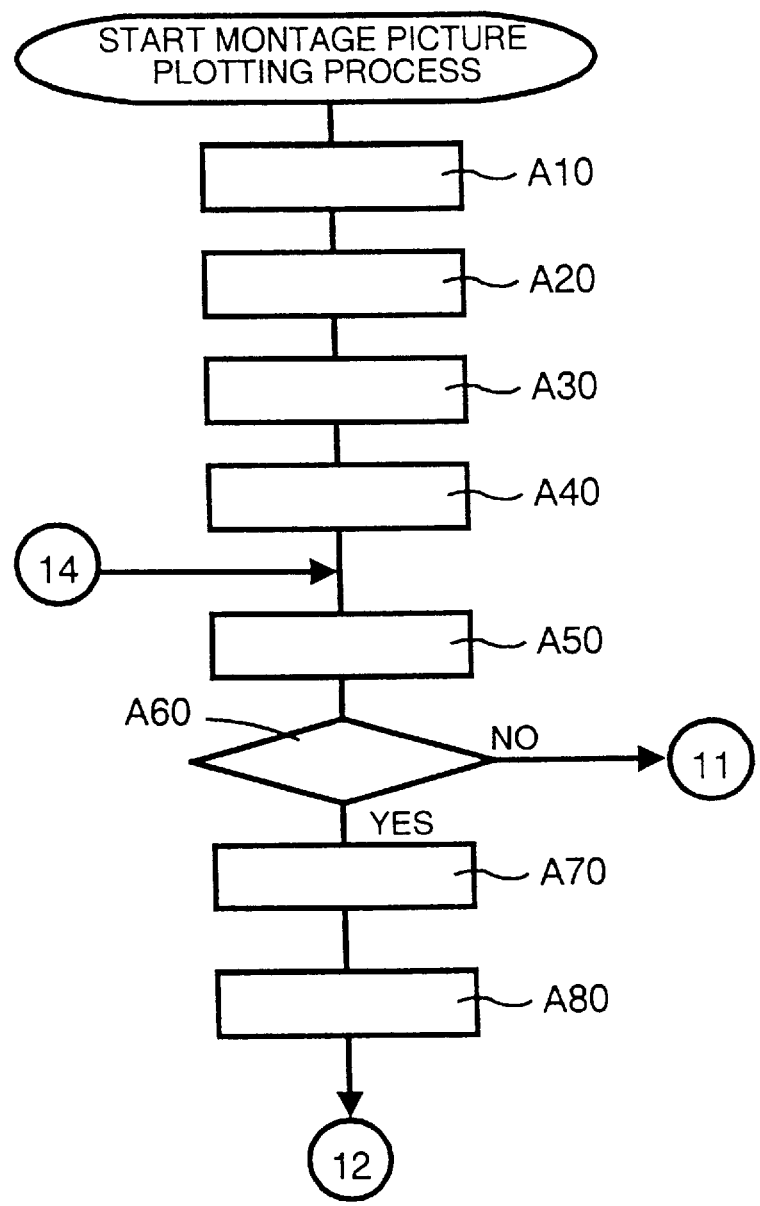

Fig. 8B

| MONTAGE PICTURE PLOTTING PROCESS | |
|---|---|
| STEP | ACTION |
| A10 | ACQUISITION OF AREA IN WHICH PICTURE IS TO BE RENEWED |
| A20 | ACQUISITION OF WHOLE OCCUPATION AREA |
| A30 | ACQUISITION/INITIALIZATION OF BIT-MAP DATA CREATING AREA |
| A40 | SETTING OF HAIRDO PATTERN |
| A50 | SCALING |
| A60 | OVERLAPPED PART ? |
| A70 | READING/SETTING OF OUTLINE DATA |
| A80 | CONVERSION OF OUTLINE DATA |

Fig. 9B

| STEP | ACTION |
|------|--------|
| A90 | FACE OUTLINE OR EAR ? |
| A100 | CREATION OF DATA FOR ELIMINATING BACKGROUND |
| A110 | FORMATION OF BIT-MAP DATA |
| A120 | CHANGE TO A PART ON FRONT SIDE |
| A130 | RESIDUAL PART ? |
| A140 | TRANSFER TO FRAME BUFFER |
|  | RETURN |

Fig. 12B

| | INITIALIZATION CHANGING PROCESS |
|---|---|
| STEP | ACTION |
| B10 | DISPLAY OF INITIALIZATION SCREEN |
| B20 | TAKE-IN OF MOUSE/KEY INPUT |
| B30 | REFERENCE EXAMPLE ? |
| B35 | SETTING OF REFERENCE EXAMPLE |
| B40 | HAIRDO PATTERN ? |
| B45 | ATTRIBUTE CHANGE OF HAIRDO PATTERN |
| B50 | FACE OUTLINE ? |
| B55 | ATTRIBUTE CHANGE OF FACE OUTLINE |
| B60 | EYEBROWS ? |
| B65 | ATTRIBUTE CHANGE OF EYEBROWS |
| B70 | EYES ? |
| B75 | ATTRIBUTE CHANGE OF EYES |
| B80 | CANCEL ? |

Fig. 13B

| STEP | ACTION |
|---|---|
| B90 | OK ? |
| B100 | INITIALIZATION DECISIONAL PROCESS |
| B110 | MONTAGE PICTURE PLOTTING PROCESS |
| B120 | OK/CANCEL ? |
| B130 | NEXT CANDIDATE RE-SELECTION (PRECEDING CANDIDATE RE-SELECTION) |
| B140 | ERASURE OF INITIALIZATION SCREEN |
|  | RETURN |

Fig. 16B

| STYLE SELECTING PROCESS | |
|---|---|
| STEP | ACTION |
| C10 | TAKE-IN OF MOUSE/KEY INPUT |
| C20 | STYLE SELECTION |
| C30 | OK ? |
| C40 | STYLE DECISION |
|  | RETURN |

Fig. 17B

| PART SELECTING PROCESS | |
|---|---|
| STEP | ACTION |
| D10 | KEY/MOUSE ? |
| D20 | PART SELECTION WITH UPPER/LOWER CURSOR KEY |
| D30 | SINGLE/DOUBLE ? |
| D100 | SINGLE CLICK PROCESS |
| D200 | DOUBLE CLICK PROCESS |
|  | RETURN |

Fig. 18B

| SINGLE CLICK PROCESS | |
|---|---|
| STEP | ACTION |
| D110 | TAKE-IN OF CLICK POINT |
| D120 | ACQUISITION OF WHOLE OCCUPATION AREA OF MONTAGE PICTURE |
| D130 | SETTING OF FRONT MOST PART |
| D140 | CALCULATION OF COORDINATE DATA OF ORIGINAL OCCUPATION |
| D150 | CALCULATION OF COORDINATE DATA OF OBJECT PART FOR SELECTION |
| D160 | DOES OVERLAP EXIST ? |
| D170 | DOES BACK SIDE PART EXIST ? |
| D180 | SETTING OF BACK SIDE PART |
| D190 | DECISION OF OBJECT PART FOR SELECTION |
|  | RETURN |

Fig. 19B

| | DOUBLE CLICK PROCESS |
|---|---|
| STEP | ACTION |
| D210 | TAKE-IN OF CLICK POINT |
| D220 | ACQUISITION OF WHOLE OCCUPATION AREA OF MONTAGE PICTURE |
| D230 | SETTING OF FRONT MOST PART |
| D240 | CALCULATION OF COORDINATE DATA OF ORIGINAL OCCUPATION AREA |
| D250 | CALCULATION OF COORDINATE DATA OF OBJECT PART FOR SELECTION |
| D260 | DOES OVERLAP EXIST ? |
| D270 | DOES BACK SIDE PART EXIST ? |
| D280 | SETTING OF BACK SIDE PART |
| D290 | DECISION OF OBJECT PART FOR SELECTION |
| D300 | DISPLAY OF TABLE |
| | RETURN |

Fig. 21B

| STEP | PART SIZE CHANGING PROCESS |
|---|---|
| | ACTION |
| E10 | SPECIFICATION OF OBJECT PART |
| E20 | ACQUISITION OF ORIGINAL OCCUPATION AREA |
| E30 | MENU DISPLAY |
| E40 | CHECK OF PRESENT STATE |
| E50 | MARKING OF CHECK MARK |
| E60 | STANDARD ? |
| E70 | A LITTLE LARGE ? |
| E80 | A LITTLE SMALL ? |
| E90 | LONG IN LENGTH ? |
| E100 | LONG IN BREADTH ? |
| E110 | ORIGINAL RECTANGLE |
| E120 | RATIO OF LENGTH TO BREADTH: 1.2 |
| E130 | RATIO OF LENGTH TO BREADTH: 0.8 |
| E140 | LENGTH: 1.2 TIMES   BREADTH: 0.9 TIME |
| E150 | LENGTH: 0.9 TIME   BREADTH: 1.2 TIMES |
| E160 | RENEWAL OF OCCUPATION AREA |
| E170 | CANCEL ? |
| E180 | CLOSING OF MENU |
| | RETURN |

Fig. 23B

| LEFT-RIGHT LINKAGE MODE SETTING PROCESS | |
|---|---|
| STEP | ACTION |
| F10 | MODE CHANGE ? |
| F20 | LINKAGE MODE IN THE PRECEDING TIME ? |
| F30 | CHANGE TO NON-LINKAGE MODE |
| F40 | ERASURE OF CHECK MARK |
| F50 | CHANGE TO LINKAGE MODE |
| F60 | MARKING OF CHECK MARK |
|  | RETURN |

Fig. 24B

| STEP | PATTERN SELECTING PROCESS |
|---|---|
| | ACTION |
| G10 | EYES OR EARS ? |
| G20 | LINKAGE MODE ? |
| G30 | SETTING OF TWIN PARTS |
| G40 | KEY OR MOUSE ? |
| G50 | SELECTION WITH LEFT/RIGHT CURSOR KEY |
| G60 | SINGLE CLICK OR DOUBLE CLICK ? |
| G100 | PROCESS FOR SINGLE CLICK |
| G200 | PROCESS FOR DOUBLE CLICK |
| | RETURN |

Fig. 25B

| \ | PROCESS FOR SINGLE CLICK |
|---|---|
| STEP | ACTION |
| G110 | PATTERN VALUE DISPLAYING COLUMN ? |
| G120 | MOVEMENT OF SLIDER |
| G130 | DECISION OF PATTERN VALUE |
| G140 | RIGHT CLICK OR LEFT CLICK ? |
| G150 | INCREMENT |
| G160 | DECREMENT |
|  | RETURN |

Fig. 26B

| \multicolumn{2}{c}{PROCESS FOR DOUBLE CLICK} | |
|---|---|
| STEP | ACTION |
| G210 | OUTSIDE THE TABLE ? |
| G220 | ON THE PATTERN ? |
| G225 | SETTING OF SELECTED CANDIDATE |
| G230 | ON SCROLL BAR ? |
| G235 | SCROLLING |
| G240 | ON THE OK SWITCH ? |
| G245 | ADOPTION OF SELECTED CANDIDATE |
| G250 | ON THE CANCEL SWITCH ? |
| G260 | ERASURE OF TABLE |
|  | RETURN |

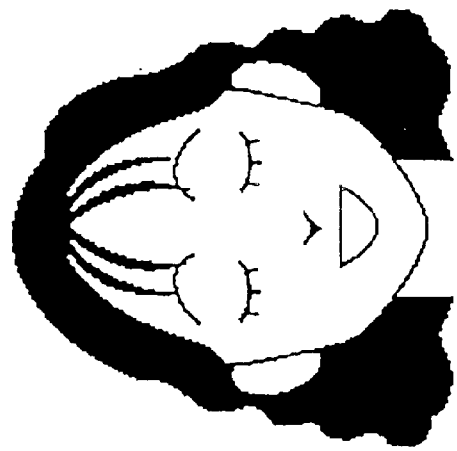
Fig.27 C LINKAGE MODE
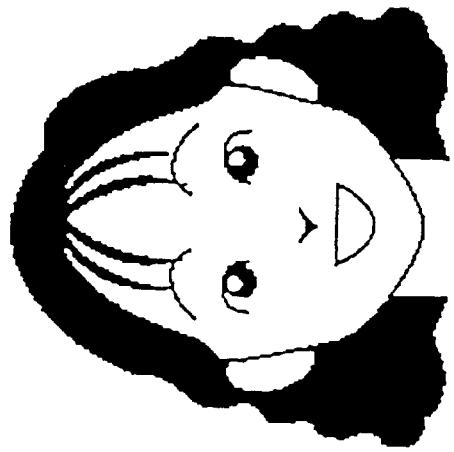
Fig.27 A
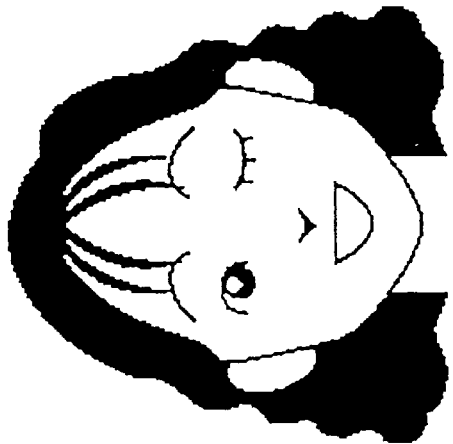
Fig.27 B NON-LINKAGE MODE

Fig. 28B

| | PART MOVING PROCESS |
|---|---|
| STEP | ACTION |
| H10 | GRASP OF OBJECT PART FOR MOVEMENT |
| H20 | HAIRDO PATTERN OR FACE OUTLINE ? |
| H30 | EYEBROW, NOSE, MOUTH OR FORELOCK ? |
| H32 | TAKE-IN OF DRAG OPERATION QUANTITY |
| H34 | ZERO IN HORIZONTAL DIRECTION |
| H36 | OUTSIDE THE FACE OUTLINE ? |
| H38 | CALCULATION OF MOVEMENT QUANTITY IN VERTICAL DIRECTION |
| H40 | EYE OR EAR ? |
| H42 | LINKAGE MODE ? |
| H44 | CALCULATION OF MOVEMENT QUANTITY ON A SIDE |
| H50 | SETTING OF TWIN PARTS |
| H52 | CALCULATION OF MOVEMENT QUANTITY ON BOTH SIDES |
| | RETURN |

Fig. 32B

| | OUTPUT PICTURE PLOTTING PROCESS |
|---|---|
| STEP | ACTION |
| J10 | READING OF DEFAULT VALUE |
| J20 | ACQUISITION/INITIALIZATION OF BIT-MAP DATA CREATING AREA |
| J30 | CALCULATION OF RATIO OF PLOTTING AREA TO ORIGINAL AREA |
| J40 | SETTING OF PART ON BACK SIDE |
| J50 | CONVERSION TO BIT-MAP DATA |
| J60 | END ? |
| J70 | PLOTTING OF PICTURE ON PLOTTING AREA SCREEN |
| | RETURN |

Fig. 33B

| SCALING PROCESS | |
|---|---|
| STEP | ACTION |
| K10 | ENLARGEMENT ? |
| K20 | CONTRACTION ? |
| K30 | ADDITION OF PREDETERMINED DOTS IN LENGTH AND BREADTH |
| K40 | SUBTRACTION OF PREDETERMINED DOTS IN LENGTH AND BREADTH |
| | RETURN |

PICTURE MAKING APPARATUS FOR CREATING A PICTURE FOR PRINTING BY ASSEMBLING AND POSITIONING COMPONENT PARTS

BACKGROUND OF THE INVENTION

1. Field of the Invention

The invention relates to a montage picture making apparatus.

2. Description of the Related Art

As described in Japanese Laid-open Utility Model Publication No. 57-156952, Japanese Laid-open Patent Publication No. 4-338877 and European Patent Publication No. 584759, a conventional montage picture making apparatus is known to the public in which a plurality of patterns of parts in the faces of men and women, such as hairdo patterns, eyebrows, eyes, noses, ears and mouths are stored in a memory and desirable ones are selected and displayed on a screen to make a likeness.

In the case of one conventional montage picture making apparatus, when patterns of respective parts are selected, they are arranged at preallotted positions on a display as they are (hereinafter referred to as a position fixed system); in the case of another apparatus, after the selection of patterns of parts, they are disposed in proper positions using a cursor or pointer device (hereinafter referred to as a lucky-laughing-face system).

SUMMARY OF THE INVENTION

In order to use various kinds of faces with a position fixed system, for example, even in the case of an eye of a certain shape, a plurality of patterns having different balances in heights and/or breadth have to be prepared. As a result, the kinds of faces which can be expressed in the system are limited or the numbers of permutations of each feature would become unwieldy.

On the other hand, in the case of the lucky-laughing-face system, the parts have to be moved by the cursor to obtain the balance in height of the eyes and a nose or the balance in height of the eyebrows and the eyes, which is very troublesome and requires an advanced degree of skill.

In either system, even though it is desirable that the same shaped face or eyes be used for the face of a child and the face of an adult, actually separate patterns have to be prepared, which also limits the kinds of faces that can expressed or prepared.

In the technique described in European Patent Publication No. 584759, it is possible to use a pattern for a variety of expressions, for example, in changing the ratio of a vertical dimension to a horizontal dimension of an eye to expanding the eye pattern vertically or horizontally. However, the expansion of a pattern requires the operation of 4 keys as well as the moving operation using a cursor so that the same type of difficulties arise in this system as in the lucky-laughing-face system. Skill is required not to cause too much expansion or similar distortions.

Therefore, an object of the invention is to offer a montage picture making apparatus in which operator skill requirements are limited in order to upgrade the number of expressions of a montage picture by preparing functions to dispose picture parts in good balance and to use a pattern in various ways by changing the ratio of a vertical dimension to a horizontal dimension of the pattern.

A montage picture making apparatus according to the invention comprises: a storage means for storing a plurality of patterns for respective parts in a face, such as a hairdo pattern, an eye, a nose, and a mouth; an occupation area decision means for deciding the occupation areas for respective parts on the screen; a selection means for selecting a desired pattern of a desired part from the storage means; a display size decision means for deciding the display size of a pattern so that the pattern of a selected part can be adapted in the occupation area allotted to the part, and a pattern display means for displaying a pattern in the predetermined occupation area allotted to the part at the decided display size.

In the case of the montage picture making apparatus as described above, when the patterns of respective parts, such as a hairdo pattern, an eye, a nose and a mouth are selected by the selection means, the display size decision means decides their display sizes so that the patterns of respective parts can be adapted to their occupation areas in an appropriate form due to the designation of occupation areas of respective parts on the screen beforehand by the occupation area decision means. Thus, the pattern display means displays the patterns of respective parts on the screen based on the designated display size to create a montage picture.

Therefore, when an occupation area is designated, assuming that it is a rectangle for example, a pattern can be displayed in various modes by changing the ratio of length to breadth. Thereby, it is possible to make montage pictures having a large number of variations without increasing the storage capacity necessary for storing patterns.

Since the decision of the shape of a pattern is made as an occupation area, assuming that the occupation area is a rectangle for example, it does not need as much skill to decide the ratio of length to breadth. As a result, the display mode of a pattern can be decided in a single way by deciding the occupation area thereby eliminating operations required in other art, such as that of European Patent Publication No. 584759.

In the case of the montage picture making apparatus described above, it is desirable that the occupation area decision means be provided with occupation area definition means by face types which decide the balance among the occupation areas of respective parts beforehand according to the type of face.

When an apparatus is structured as described above, a face of an adult can be immediately changed to a face of a child by simply selecting the type of a face, for example. In other words, when a face type of an adult is selected first and the patterns of respective parts are selected, the display sizes are decided so that the patterns can be adapted to their occupation areas in the predetermined state and a face of an adult is displayed on the screen; in this state, when the face type is changed to that of a child, the display is changed so that the respective patterns can be adapted to the occupation areas adjusted for a child without reselecting new patterns, and a face of a child is immediately displayed.

Therefore, it is possible to make an interesting montage picture, for example, from the face of an adult, the face of the person as a child can be portrayed or vice versa. As a result, the use of montage pictures is expanded and it is possible to answer a variety of demands for montage pictures by users.

In the case of the montage picture making apparatus as described above, it is preferable that the apparatus be further provided with an occupation area position adjustment means for adjusting the positions of occupation areas of the parts on the screen or an occupation area size adjustment means for adjusting the sizes of occupation areas of the parts on the screen.

In structuring the apparatus as described above, the degree of freedom in expression is further upgraded, for example, by changing the height of eyes or the interval between eyes, or by using an eye of a type such as a large eye or a small eye. The operation of expansion or contraction in length or breadth of a pattern can be performed by a single control of changing an occupation area, and the operability is improved much in comparison with that in the technique described in European Patent Publication No. 584759.

A pattern to be adapted to an occupation area can be expressed by a bit map system, but it is preferable that the patterns of respective parts are stored in the form of outline data in the storage means and the display decision means decides display sizes so that the patterns of selected parts can be adapted to their occupation areas in a predetermined state in the form of outline data. In the case of outline data, even if the ratio of length to breadth is changed, when the patterns are finally displayed on the screen, notches caused by bits are not conspicuous and they look beautiful.

BRIEF DESCRIPTION OF THE DRAWINGS

FIGS. 4A–4D shows changing the image in various standard styles of the embodiment;

FIG. 6B is a table of labels for FIG. 6A;

FIG. 7B is a table of labels for FIG. 7A;

FIG. 8A is a flowchart showing a montage picture plotting process in the embodiment;

FIG. 8B is a table of labels for FIG. 8A;

FIG. 9B is a table of labels for FIG. 9A;

FIG. 12B is a table of labels for FIG. 12A;

FIG. 13B is a table of labels for FIG. 13A;

FIG. 16B is a table of labels for FIG. 16A;

FIG. 17B is a table of labels for FIG. 17A;

FIG. 18B is a table of labels for FIG. 18A;

FIG. 19B is a table of labels for FIG. 19A;

FIG. 21B is a table of labels for FIG. 21A;

FIG. 23B is a table of labels for FIG. 23A;

FIG. 24B is a table of labels for FIG. 24A;

FIG. 25B is a table of labels for FIG. 25A;

FIG. 26B is a table of labels for FIG. 26A;

FIGS. 27A–27C represent a screen during a pattern selecting process in the embodiment;

FIG. 28B is a table of labels for FIG. 28A;

FIG. 32B is a table of labels for FIG. 32A;

FIG. 33B is a table of labels for FIG. 33A.

DESCRIPTION OF THE PREFERRED EMBODIMENT

A montage picture making apparatus in an embodiment according to the invention will be explained with reference to the drawings.

Figure 1:
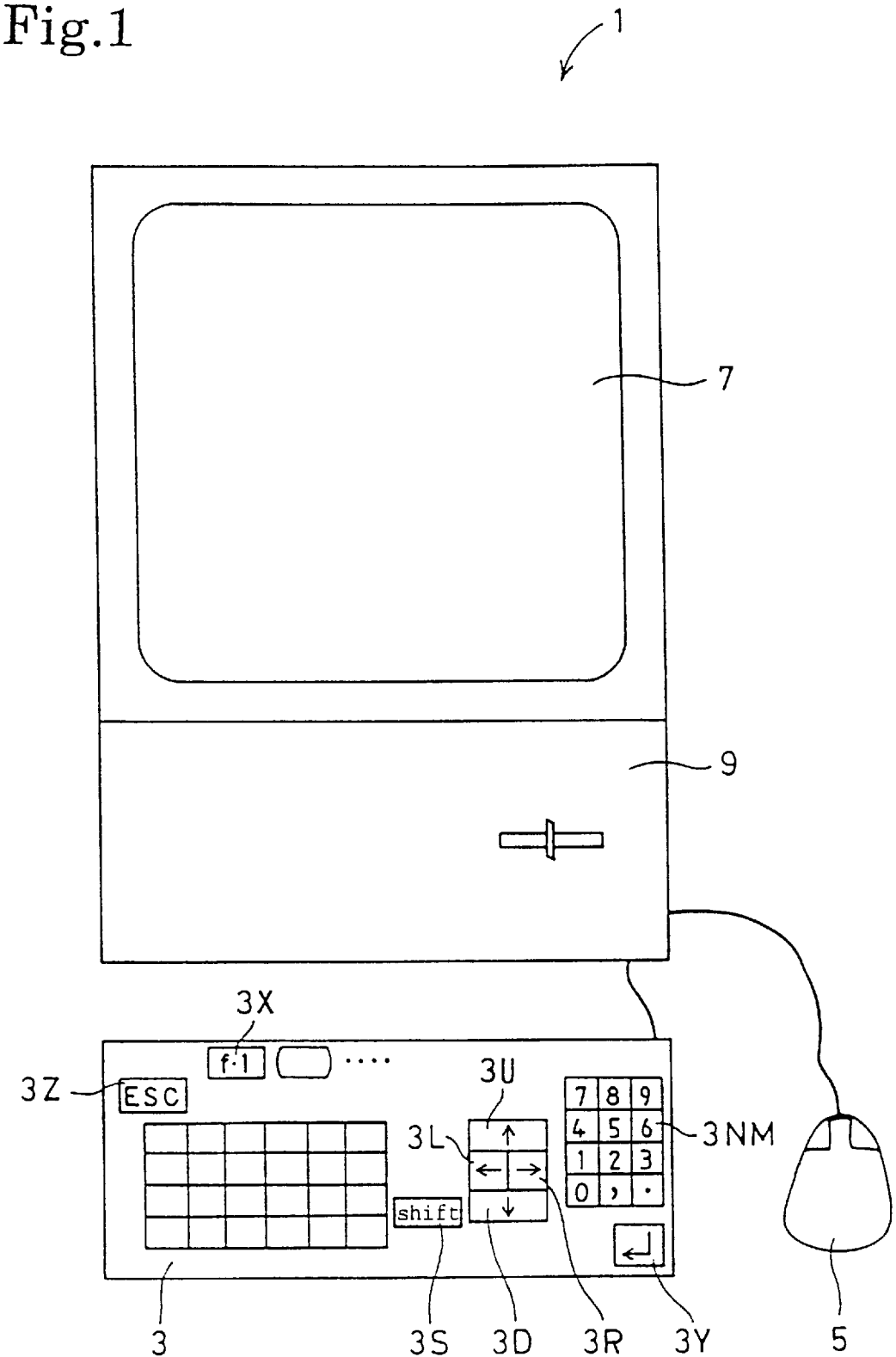
FIG. 1 is a structural front view showing an embodiment of the montage picture making apparatus.

A montage picture making apparatus 1 of the embodiment comprises a personal computer 9 having installed therein an application program and a variety of data for making a montage picture. A keyboard 3, a mouse 5 and a display 7 are connected to the personal computer 9 as shown in FIG. 1.

The system preferably uses a VGA display with the picture displayed at a resolution of 640 dots×480 dots at the maximum.

The application program operates within the WINDOWS®, by Microsoft Inc., environment and it has a function to display a picture with a B spline curve based on the outline data.

Figure 2:
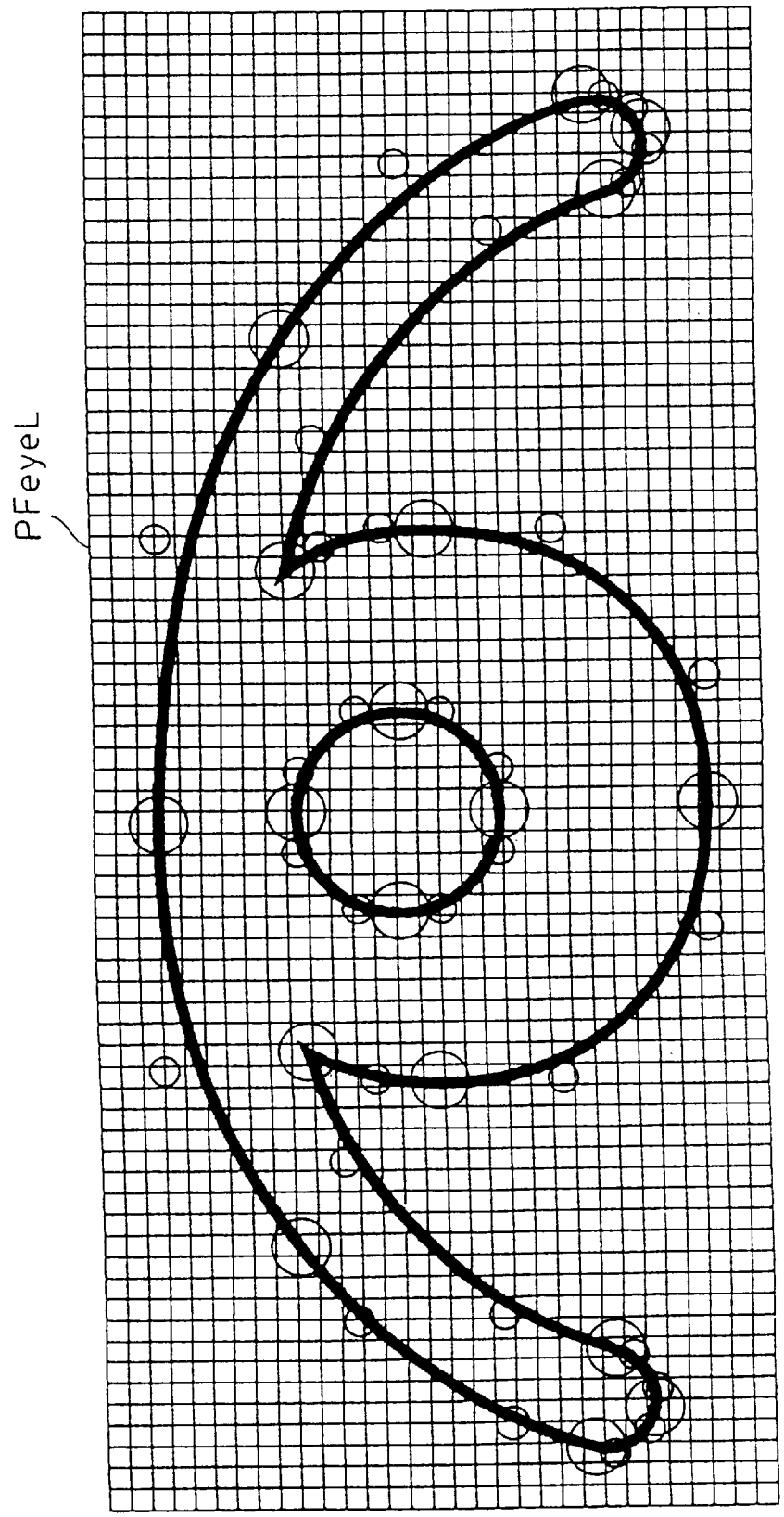
FIG. 2 shows an example of outline data in the embodiment.

A plurality of patterns are given to each part such as a hairdo pattern, an eye, a nose or a mouth. Respective patterns are given in the form of outline data. FIG. 2 is an example of outline data of a left eye. The respective outline data are, as shown in the figure, defined with rasterized data being composed of points expressed by rectangular coordinates in a frame PFeyeL (hereinafter referred to as a part frame (PF)). The rasterized data are stipulated for plotting a picture with a B spline curve. A point shown with a large circle is a reference point for plotting a B spline curve and a point shown with a small circle is an auxiliary reference point.

A part frame has a decided (breadth)×(height) for each part in a face such as a hairdo pattern, an eye, a nose and a mouth. For example, a part frame for a hairdo pattern is of a size of 1000 dots×1000 dots and that for the outline of a face is of a size of 1000 dots×1000 dots and so on. For an eye and an ear, left-right symmetrical data of the same pattern number are given to produce a right eye, a left eye, a right ear and a left ear. Thereby, in a left-right linkage mode, to be explained later, when a pattern number for a right eye is designated, a left eye of the same pattern number can be selected simultaneously.

The data of "reference style of face" which decide the areas and the positional relations to be occupied by respective parts to make up a montage picture are also part of the system in addition to the data for patterns. In the embodiment, four types of data, "standard," "thick," "thin" and "child," are given as "reference styles of face."

Figure 3:
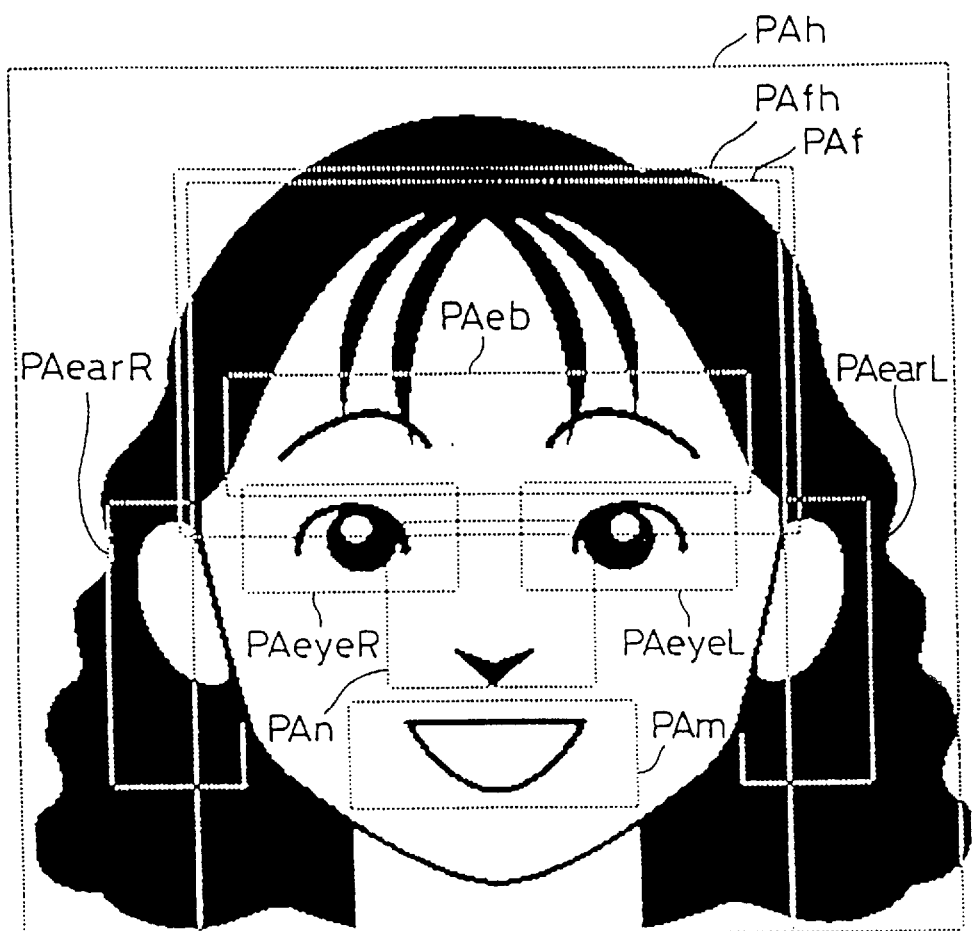
FIG. 3 is an example of standard styles of faces in the embodiment.

For example, in the case of a reference style of "child," the areas and the positional relations to be occupied by respective parts are as shown in FIG. 3. Assuming that the entire display area of the montage picture is in the range of coordinates of (0, 0) to (400, 400), that is, 400 dots×400 dots, the occupation areas of respective parts PAh, PAf, ... are determined as shown in Table 1 below. The values used can be determined by statistically analyzing the sizes of the various parts and the balance in positions of the parts in the faces of children.

TABLE 1

Reference Style "child"
Parts Coordinates

| Symbol | Name (Left-upper Vertex, Right-lower Vertex) |
|---|---|
| PAh | Hairdo style [(10, 15) (389, 399)] |
| PAf | Outline of face [(80, 67) (319, 399)] |
| PAfh | Forelock [(75, 61) (325, 222)] |
| PAeb | Eyebrow [(94, 150) (305, 204)] |
| PAeyeR | Right eye [(100, 198) (187, 247)] |
| PAeyeL | Left eye [(212, 198) (299, 247)] |
| PAearR | Right ear [(46, 206) (100, 333)] |
| PAearL | Left ear [(299, 206) (353, 333)] |
| PAn | Nose [(157, 215) (242, 290)] |
| PAm | Mouth [141, 295) (258, 343)] |

The part occupation areas (PA) PAh, PAf, ... denote the areas in which the part frames of respective pattern data are to be adapted. For example, the part frame of a left eye PFeyeL, in FIG. 2, is displayed on the screen being enlarged or contracted in length or height so that it can be adapted to the area shown in the PAeyeL in Table 1.

The "Standard" shows a standard face of an adult, and respective occupation areas are decided based on the balance analysis of the respective parts of adults, and "thick" or "thin" occupation areas are decided based on the balance analysis of respective parts in the faces of heavy/large or thin/small adults, respectively. Therefore, for example, in the case of "child," the occupation area of the right eye is from (100, 198) to (187, 247), but in the case of a "standard" adult, the occupation area is smaller than the above. The reason is that in the case of an adult the area occupied by an eye, relative to the face, is smaller than that in the case of a child. Therefore, even in the case of a right eye of the same pattern, when the reference style is "child" it is displayed larger and when the reference style is "standard" it is displayed smaller relative to the face as a whole.

The display results with different reference styles are shown in FIG. 4. When 3 patterns, "(A): standard," "(B): thick" and "(C): thin," are compared among themselves, the sizes of occupation areas of parts such as "eyebrow," "eye," "nose," "mouth" and "ear" and their positions are delicately different. In particular, it is seen that the intervals between "eyes" and "ears" are different or "eye" size is different as shown in the figures. About "hairdo pattern," "forelock" and "outline of face," the breadths of occupation areas are different, and it is seen that the images of faces differ delicately, as expressed by respective reference styles, according to "standard," "thick" and "thin." When "(A): standard" and "(D): child" are compared to one another, even though the same parts are selected, the representation of an adult and the representation of a child are clearly expressed because of the differences in the occupation areas.

As described above, when respective patterns are displayed in adapting part frames to the respective occupation areas of the parts, even though the same parts are selected, faces having delicately different images can be expressed. In this case, in particular, in the embodiment, outline data are used for respective patterns, so that even if the patterns are adapted to occupation areas of different sizes, notches do not appear in the part as represented on the screen. Finally, bit-map data are made based on the picture obtained by adapting the outline data to occupation areas. The bit-map data are set in a frame buffer and a montage picture is made as if the bit-map data are stuck on a sample display column 21 or a picture plotting area 10 (FIG. 5).

Figure 5:
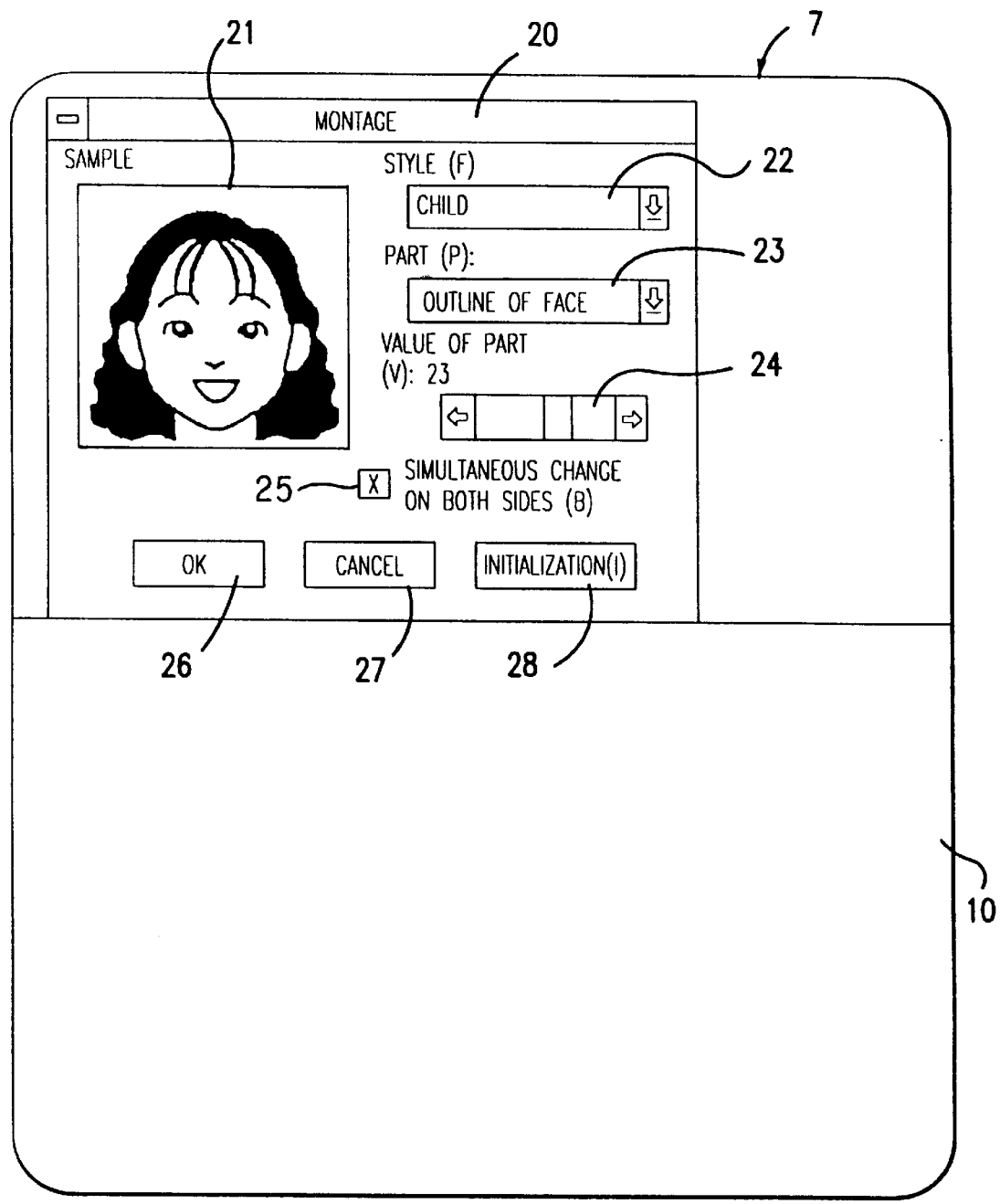
FIG. 5 is an example of an initial screen when the application program is energized in the embodiment.
Figure 6A:
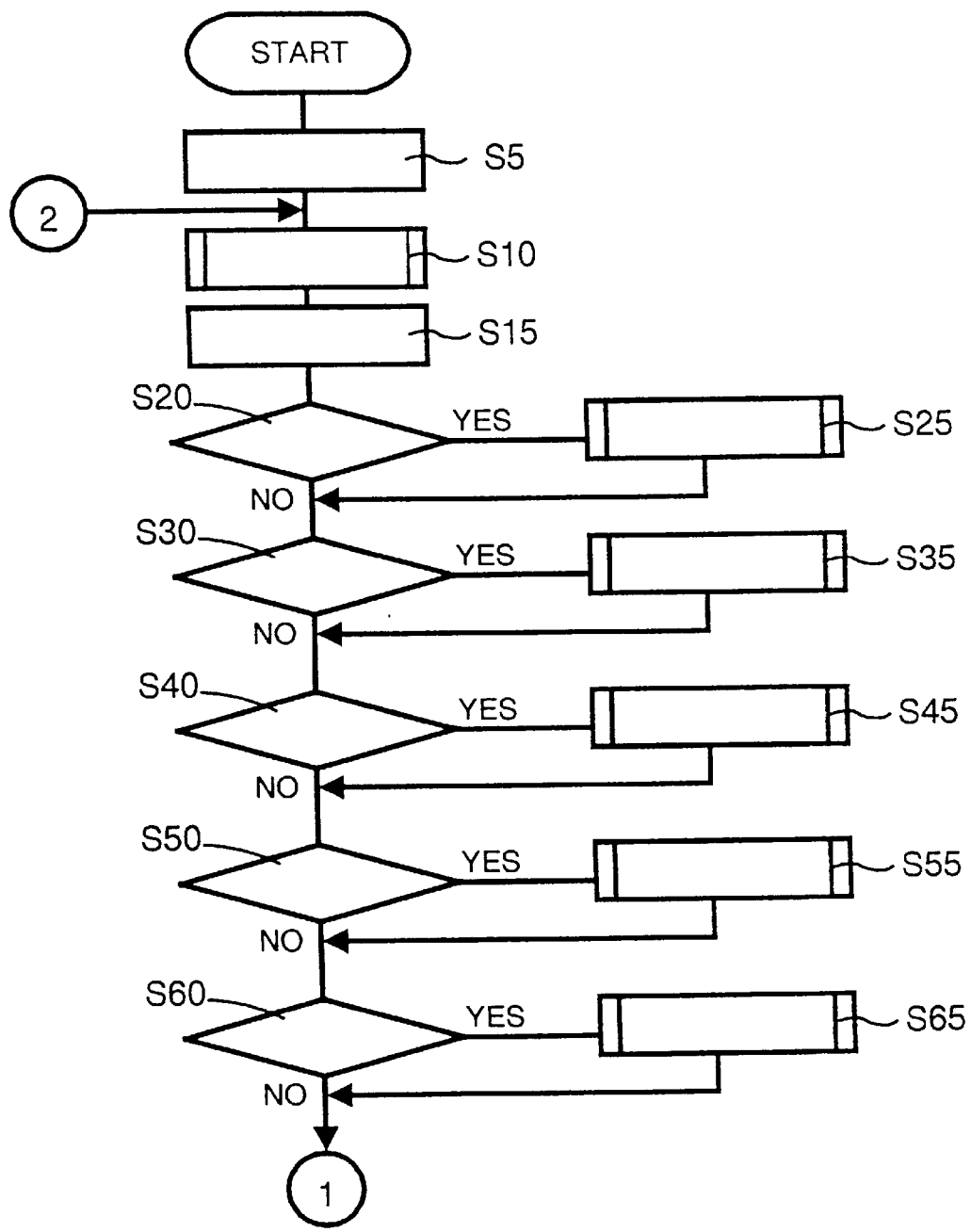
FIG. 6A is a flowchart showing part of a main routine of the embodiment.

On the other hand, when the installed application program is initiated, as shown in FIG. 5, an operational area screen 20 having the sample display column 21, a style selection display column 22, a part selection display column 23, a pattern value display column 24, a left-right linkage instruction column 25, an OK column 26, a cancel column 27 and an initial setting column 28 is displayed beside the picture plotting area screen 10 on the display 7.

In the picture plotting area screen 10, a picture plotting area of 128 dots×128 dots is set by a default rule. This is a picture for the data for a montage picture made by an apparatus according to the invention that is output to a Tapewriter (Tapewriter is a market name for a printer to use for printing files, etc. on an adhesive backed tape of 24 cm breadth). In the case where the data for the montage picture are to be output to a narrower tape, or to a sheet of paper of A4 size using a laser printer as an output device, the picture plotting area can be adjusted, that is, enlarged or contracted.

The sample display column 21 is a column to confirm the completed face and a picture plotting area of 180 dots×180 dots is set for the column.

The style selection display column 22 displays the selected reference style of a face. In the embodiment, as described above, the reference style of a face can be selected from "standard," "thick," "thin" and "child." In the figure, "child" is selected as the reference style of face. Therefore, the montage picture is so made that the entire face gives an infantile image. When the mouse cursor is placed on the column 22, by moving the mouse 5 and depressing a button provided on the right side of the mouse 5 (hereinafter referred to as a right click), the style selection state can be changed in the forward direction, "standard" to "thick" to "thin" to "child" to "standard" to . . . . When a button provided on the left side of the mouse 5 is depressed (hereinafter referred to as a left click), the style selection state can be changed in the reverse direction, "child" to "thin" to "thick" to "standard" to "child" to . . . When a shift key 3S and a right cursor key 3R are operated together, the style selection state can be changed in the forward direction in the same way as the right click of the mouse 5 and when the shift key 3S and a left cursor key 3L are operated together, the style selection state can be changed in the reverse direction in the same way as the left click of the mouse 5.

The part selection display column 23 displays the object part being selected at the time from among the parts, such as a hairdo pattern, an eye, a nose and a mouth. In FIG. 5, "outline of face" is shown as the selected object part. Therefore, it is in a state where the "outline of face" can be changed. For column 23, when a right click is operated in a state where the mouse cursor is placed on the column 23, an object part for selection is changed in the forward direction, that is, "hairdo pattern" to "outline of face" to "eyebrow" to "eye" to . . . and when a left click is operated, the object part for selection is changed in the reverse direction. In the case of a key input, kinds of parts can be changed in the forward direction or the reverse direction by the operation of a up cursor key 3U or a down cursor key 3D.

The pattern value display column 24 displays the value corresponding to the number of the pattern using a numerical value and a scroll bar. The pattern is selected from among a plurality of patterns of the part that is the object part for selection. In the figure, it is shown that a twenty-third pattern is selected from among 37 patterns, i.e., among a first pattern to a thirty-seventh pattern, for the outline of the face. The column 24 is such that the selection of the pattern is changed by moving the mouse cursor to the scroll bar column 24 and dragging left and right with the left click button depressed. The scroll bar is moved left and right to change the pattern number and when a desired pattern number appears, the desired pattern is selected by releasing the click button. When key input is used, the selection number can be changed in the forward direction by operating the right cursor key 3R and the selection number can be changed in the reverse direction by operating the left cursor key 3L.

The left-right linkage instruction column 25 instructs whether a montage picture is to be made in the "left-right linkage mode", in which patterns and their positions are symmetrical about the center line, or whether a montage picture is to be made in the "left-right nonlinkage mode", in which patterns and their positions are asymmetrical, with respect to paired parts, such as eyes or ears. When the column 25 is in a checked state (as shown in the figure), the "left-right linkage mode" is selected. The "left-right linkage mode" and the "left-right nonlinkage mode" can be changed by moving the mouse cursor to the column 25 and performing left click or right click. In the case of key input, the mode can be switched over depressing a linkage key 3X.

The OK column 26 and the cancel column 27 function as switches to input the instructions of "OK" and "cancel." The initialization column 28 functions as a switch to energize an initialization mode. In the respective actions, when the mouse cursor is moved to any of columns 26 to 28 and the left or the right click is operated, the column functions as a switch. In the case of key input, an OK key 3Y or a cancel key 3Z is operated.

Figure 7A:
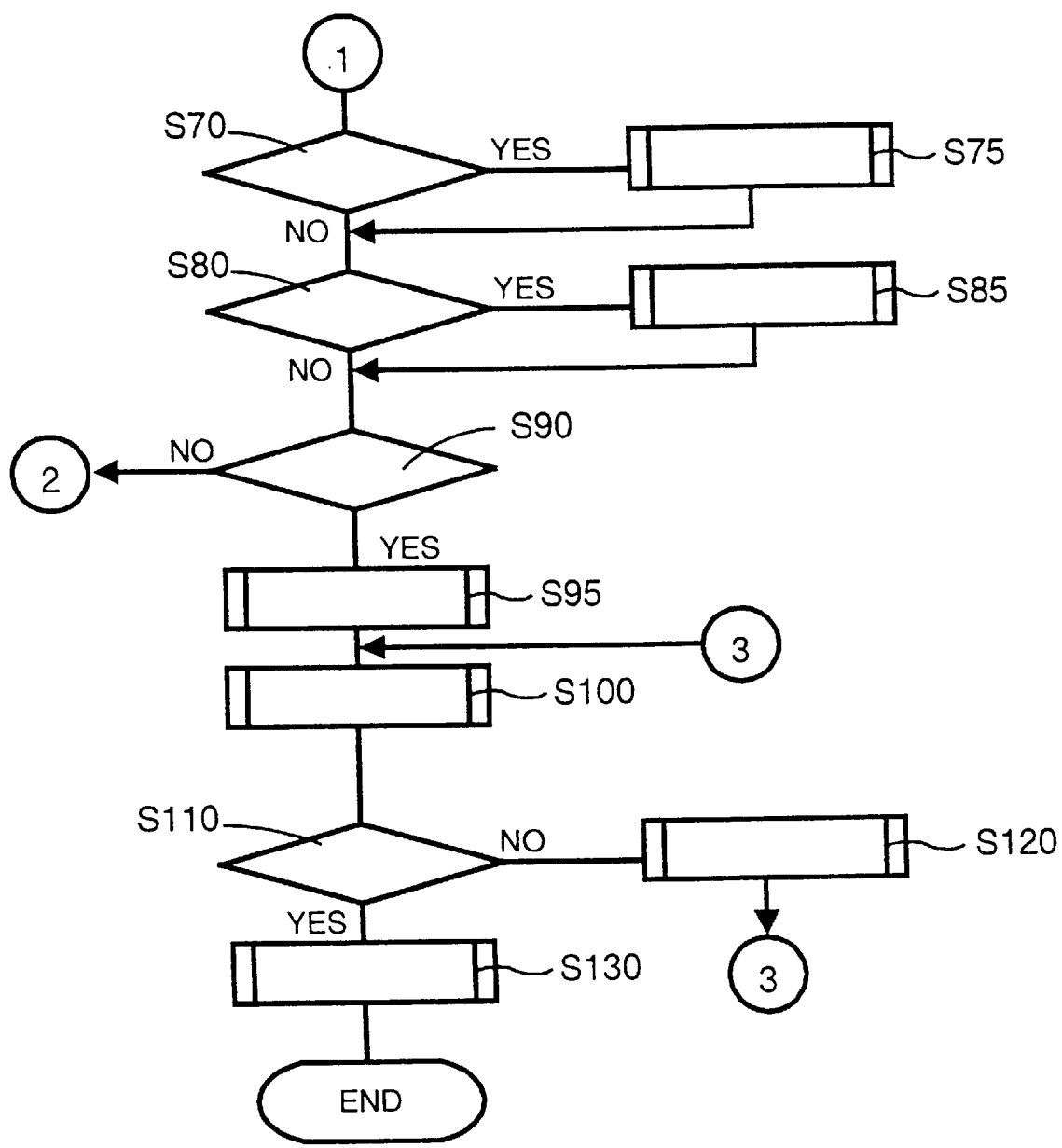
FIG. 7A is a flowchart showing part of the main routine in the embodiment.
Figure 9A:
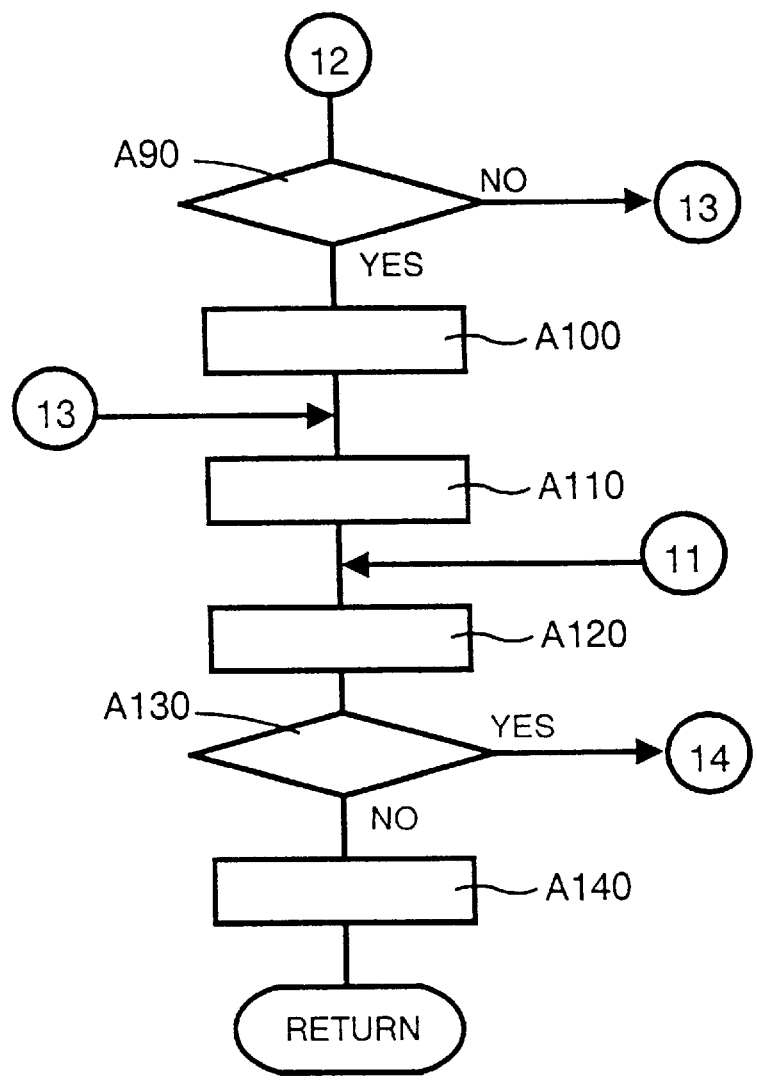
FIG. 9A is a flowchart showing a montage picture plotting process in the embodiment.
Figure 10:
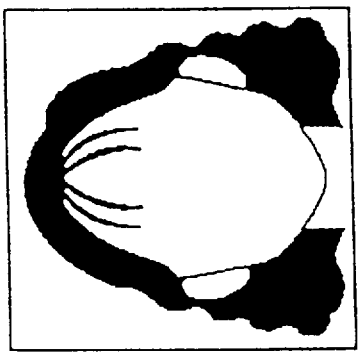
FIGS. 10A–10H shows the progress in the conversion into bit map data of a whole face.
Figure 10:
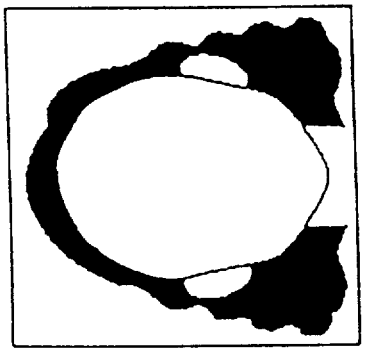
Figure 10:
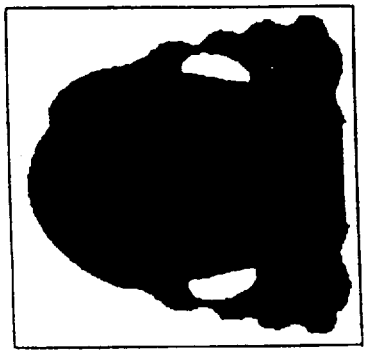
Figure 10:
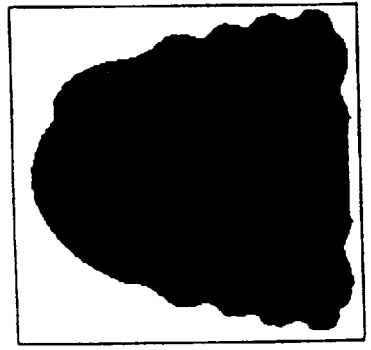
Figure 10:
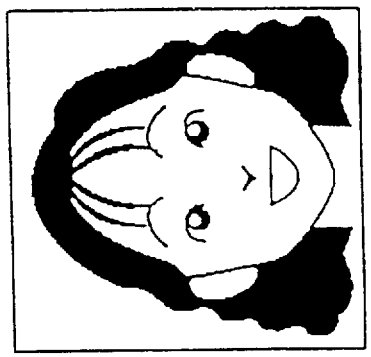
Figure 10:
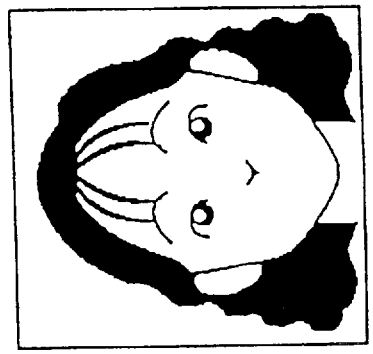
Figure 10:
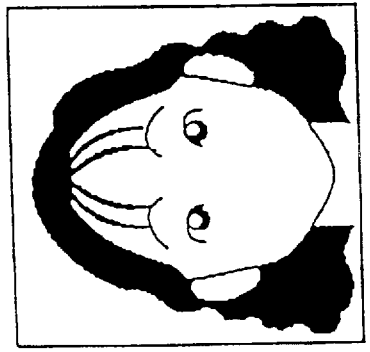
Figure 10:
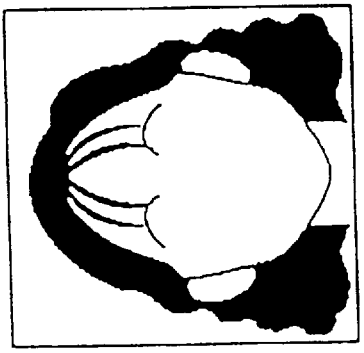

The application program has a main routine as shown in FIGS. 6a,6B and 7A,7B. The main routine, at first, executes the acquisition and setting of the preceding montage data (S5). This is a type of resuming function. In most cases it is easier to start work with reference to the result of the preceding montage picture than to start from zero to make a montage picture. The preceding montage picture data are registered in a storage device, such as a backup memory or a hard disk, which is found in the personal computer 9 or externally provided, in the montage decision process (S95) shown near the end of the main routine (FIGS. 7A,7B).

The preceding montage picture data are read from the backup memory or hard disk and the data are set in a work area of a RAM. Then the montage picture is plotted (S10) based on the data. The plotting of the montage picture, based on the preceding montage picture data, is performed in the sample display column 21 of the display 7 as shown in FIG. 5. In the following processes, until "OK" is input in step S90, the plotting of the montage picture is performed also in the sample display column 21.

When the plotting of the previous montage picture is finished, the new montage picture making process is started. In making the montage picture, the inputs from a mouse and a keyboard are taken in (S15), and one of the following processes is executed: an initialization changing process (S20: YES, S25), a style selecting process (S30: YES, S35), a part selecting process (S40: YES, S45), a part size changing process (S50: YES, S55), a left-right linkage mode setting process (S60: YES, S65), a pattern selecting process (S70: YES, S75), a part moving process (S80: YES, S85), a montage decisional process (S90: YES, S95), an output picture plotting process (S100), a scaling process (S110: NO, S120), or an output data registration process (S110: YES, S130). Until the montage picture decisional process is completed, that is, in the processes from the initialization changing process to the part moving process, the operation can be executed repeatedly. Every time any process mentioned above is executed, the revising operation of the montage picture plotting process (S10) is repeated and the newest montage picture is displayed in the sample display column 21. In the "output picture plotting process", after the montage picture decisional process, the plotting of a montage picture is executed for the picture plotting area 10.

The montage picture plotting process is described using FIGS. 8A,8B and 9A,9B.

At first, an area on the screen in which a picture is to be renewed is acquired (A10). The "area in which a picture is to be renewed" is, for example, the whole area of the sample display column 21 as in the case where the montage picture data from the preceding time are first plotted on the screen. In the case where an eye pattern is to be changed, the area is an eye area and when the position of an eye is to be moved, the area relates to two areas including the positions of the eye before the movement and after the movement.

Next, an occupation area for the whole of the montage picture is acquired (A20). An occupation area of the whole of the montage picture means the whole area of the sample display column 21. In the embodiment it has an area of 180 dots×180 dots. When a display of higher resolution (for example, a display corresponding to SVGA of 800 dots×600 dots) is used in place of the display 7, a larger occupation area can be obtained.

Next, the bit-map data making area is acquired and initialized corresponding to the area to be renewed (A30). In the case where "montage data in the preceding time" are plotted, an area of 180 dots×180 dots is acquired and initialized as a bit-map making area. On the other hand, when a pattern of an eye is to be changed, a "bit-map data making area" corresponding to the occupation area for an eye is acquired and initialized, when the entire area is assumed to be 180 dots×180 dots.

Next, a hairdo pattern, a part to be positioned in a most recessed part is set as an object part for making a picture (A40). The original occupation area of the part being set as the object part of making a picture is enlarged or contracted (A50) according to the ratio of the original whole area to the whole area acquired in step A10. In the embodiment, the occupation areas of respective parts are decided assuming that the whole area is 400 dots×400 dots, so that respective occupation areas are contracted 0.45. For example, the original occupation area PAh when the part is "hairdo pattern" and the reference style is "child" has an original occupation area PAh of (10, 15) and (389, 399), so that these values are contracted to (4.5, 6.75) and (175.05, 179.55), respectively. In the case of a right eye, the original occupation area PAeyeR of (100, 198) and (187, 247) is contracted to (45, 89.1) and (84.15, 111.15).

Next, it is judged whether an occupation area which is contracted in step A50 has an overlapped part, with an area to be renewed, or not (A60). When a picture is plotted based on the "montage picture data in the preceding time," the occupation areas of all parts are overlapped with the areas to be renewed, so that the result of judgment is always "YES." When a montage picture plotting process is performed only to change a pattern of an eye, for example, the occupation area of an ear is not overlapped with an area to be renewed, so that in some cases the answer may be "NO".

When the judgment is "YES," outline data are read based on the pattern number selected concerning the object part for plotting and the data are set in the work area (A70). In order to adapt a part frame to a contracted occupied area in step A50, the coordinates of respective reference points and auxiliary points composing the outline data are converted (A80).

Next, it is judged whether an object part for plotting is an outline of a face or an ear, or other parts (A90). When the judgment is "YES", that is, the part is a face or ear, the data for removing the background is created (A100) based on the outline data whose coordinates were converted in step A80.

Next, bit-map data are formed (A110) in the "bit-map data creating area", which is initialized in step A30, based on the outline data obtained in step A80 and the data for removing the background obtained in step A100.

An object part for plotting is changed to a part positioned on the further front side, and the processes in step A50 and following are repeated until the remaining parts become zero (A120, A130). When it is judged "NO" in step A60, steps A70 to A110 are passed and when it is judged "NO" in step 90, the step A100 is passed.

As described above, when the conversion to bit-map data for all parts is completed, the final bit-map data created in the "bit-map data creation area" are transferred to a frame buffer for plotting a montage picture (A140). Thereby, a montage picture is plotted in the sample display column 21.

In order to further clarify the above mentioned processes, the progress of creating bit-map data in the bit-map creation area, when a whole face is to be plotted, is shown in FIGS. 10A–10H. As shown in the figure, at first, a hairdo pattern is plotted (A), then ears are plotted (B), an outline of a face is plotted (C), the forelock is plotted (D), the eyebrows are plotted (E), the eyes are plotted (F), the nose is plotted (G) and the mouth is plotted (H); thus, the montage picture is completed in the "bitmap data creation area." The montage picture is plotted as if the last bit-map data (H) in the "bit-map data creation area" is placed on the sample display column 21. Therefore, the face is displayed in the sample display column instantaneously, so that even if outline data are used, the operator sees a representation of what is to be printed.

Figure 11:
FIGS. 11A–11C show the progress in the conversion into bit map data of only lips.
Figure 11:
Figure 11:
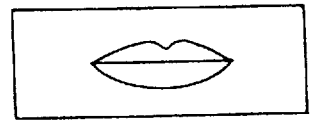
Figure 12A:
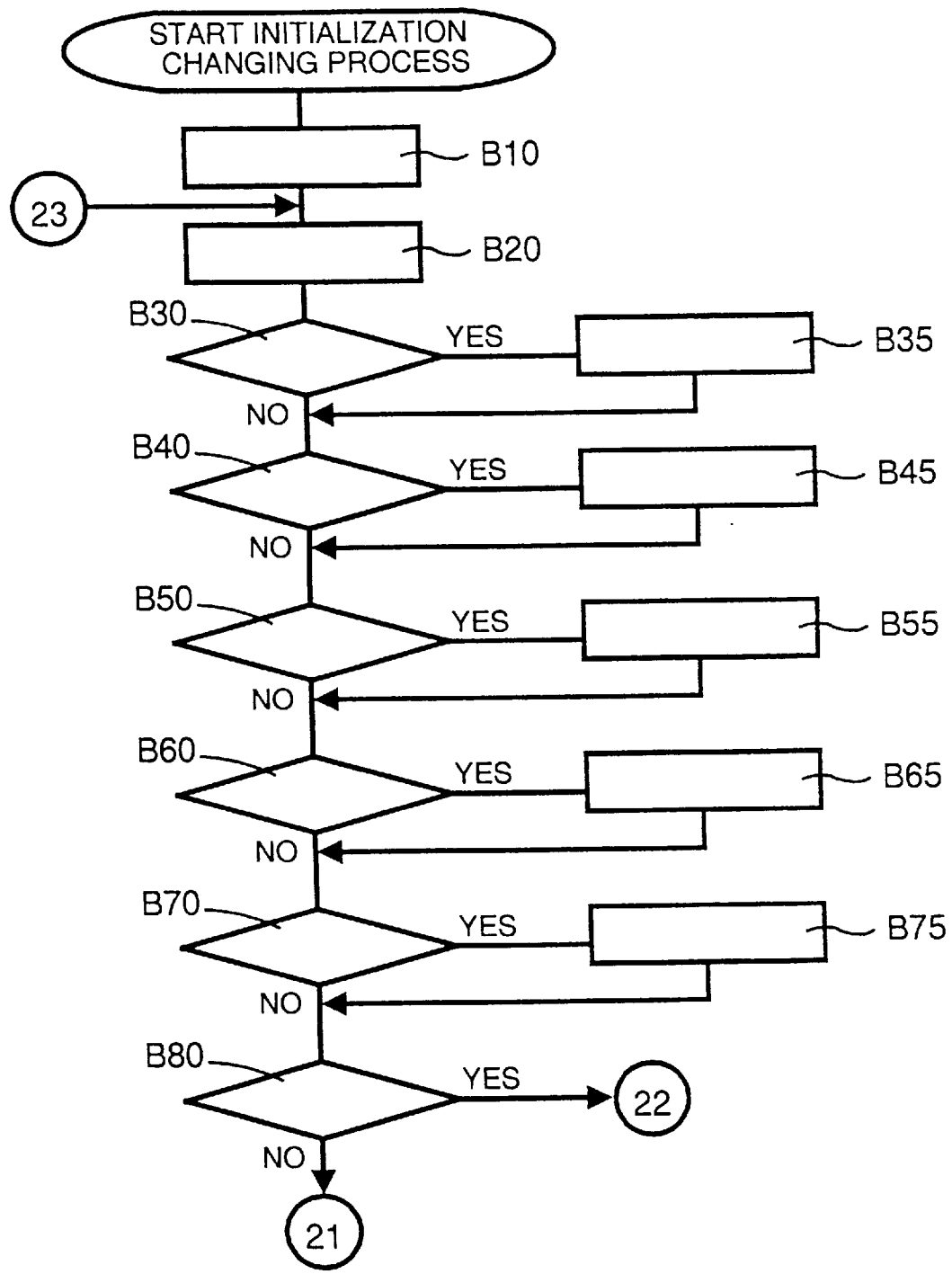
FIG. 12A is a flowchart showing the changing process of an initialization in the embodiment.
Figure 13A:
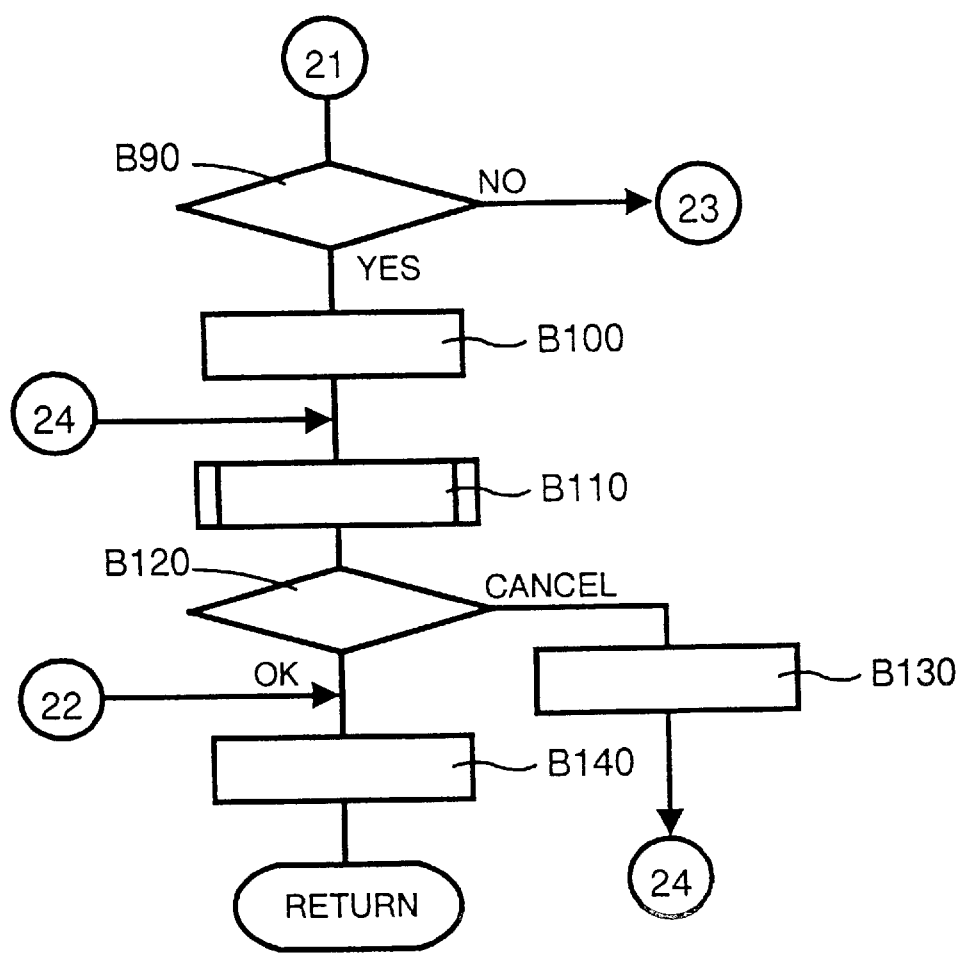
FIG. 13A is a flowchart showing the changing process of an initialization in the embodiment.

The progress of making bit-map data in the "bit-map data creation area" when the pattern of the mouth is to be changed is shown in FIGS. 11A–11C. As shown in the immediate area of the mouth of the figure, at first, the hairdo pattern is plotted (A), then the outline of a face is plotted (B) and then the mouth is plotted (C). Thus, the montage picture of the renewed part is completed in the "bit-map data creation area". The montage picture is plotted as if the bit-map data are stuck on the display area of the mouth in the sample display column 21. In the case of the mouth, the other parts, that is, the forelock, the ears, the eyebrows, the eyes, and the nose are not overlapped with the renewal area so that they are not the objects for making a bit-map.

Next, the initialization changing process will be explained. The initialization changing process is shown in FIGS. 12A,12B and 13A,13B.

Figure 14:
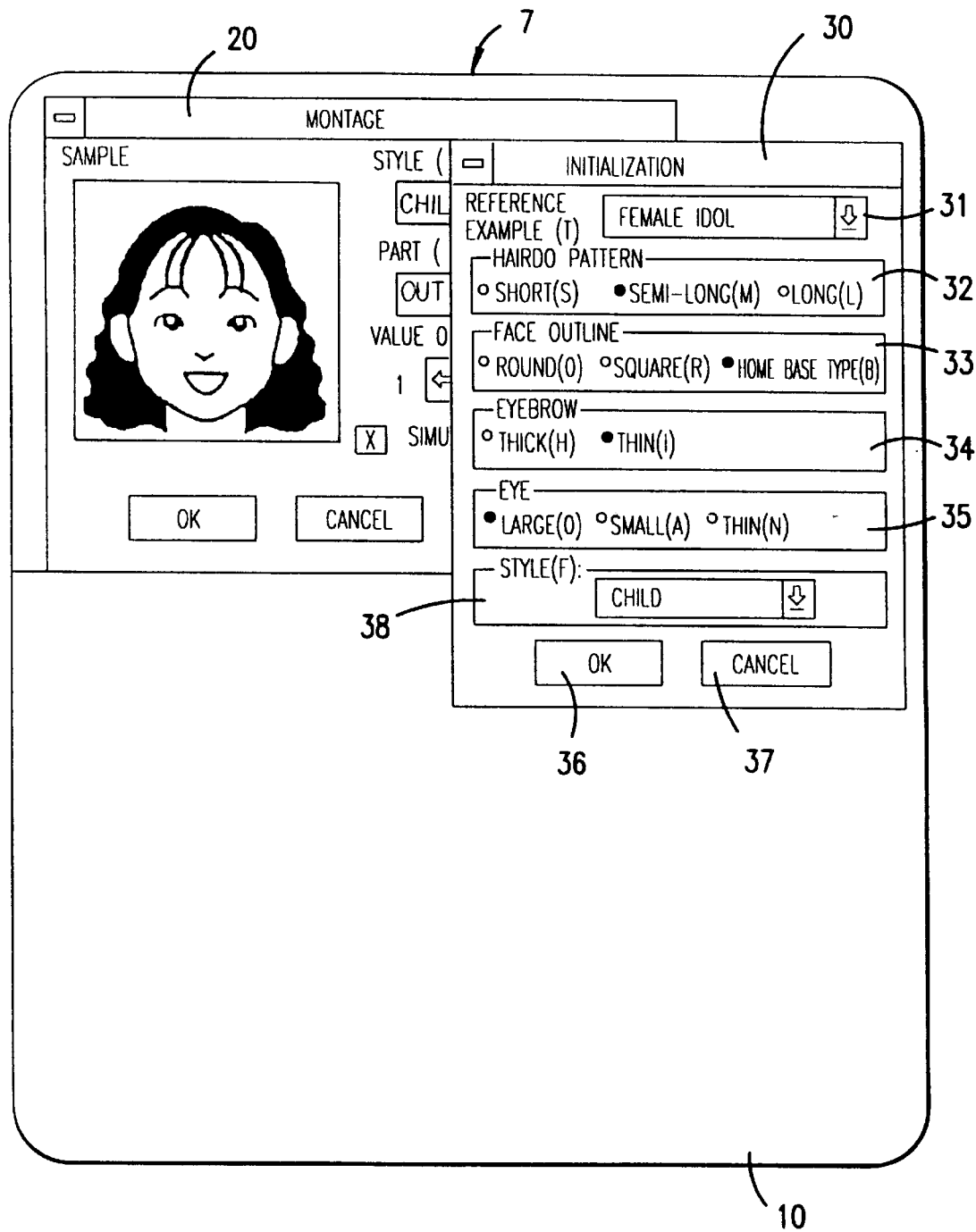
FIG. 14 represents an initialization screen in the embodiment.

At first, an initialization setting screen 30 is displayed (B10), as shown in FIG. 14. The initialization setting screen 30 includes a reference example setting column 31, a hairdo pattern setting column 32, an outline of a face setting column 33, an eyebrow setting column 34, an eye setting column 35, an OK column 36, a cancel column 37 and a style selection display column 38.

Figure 15:
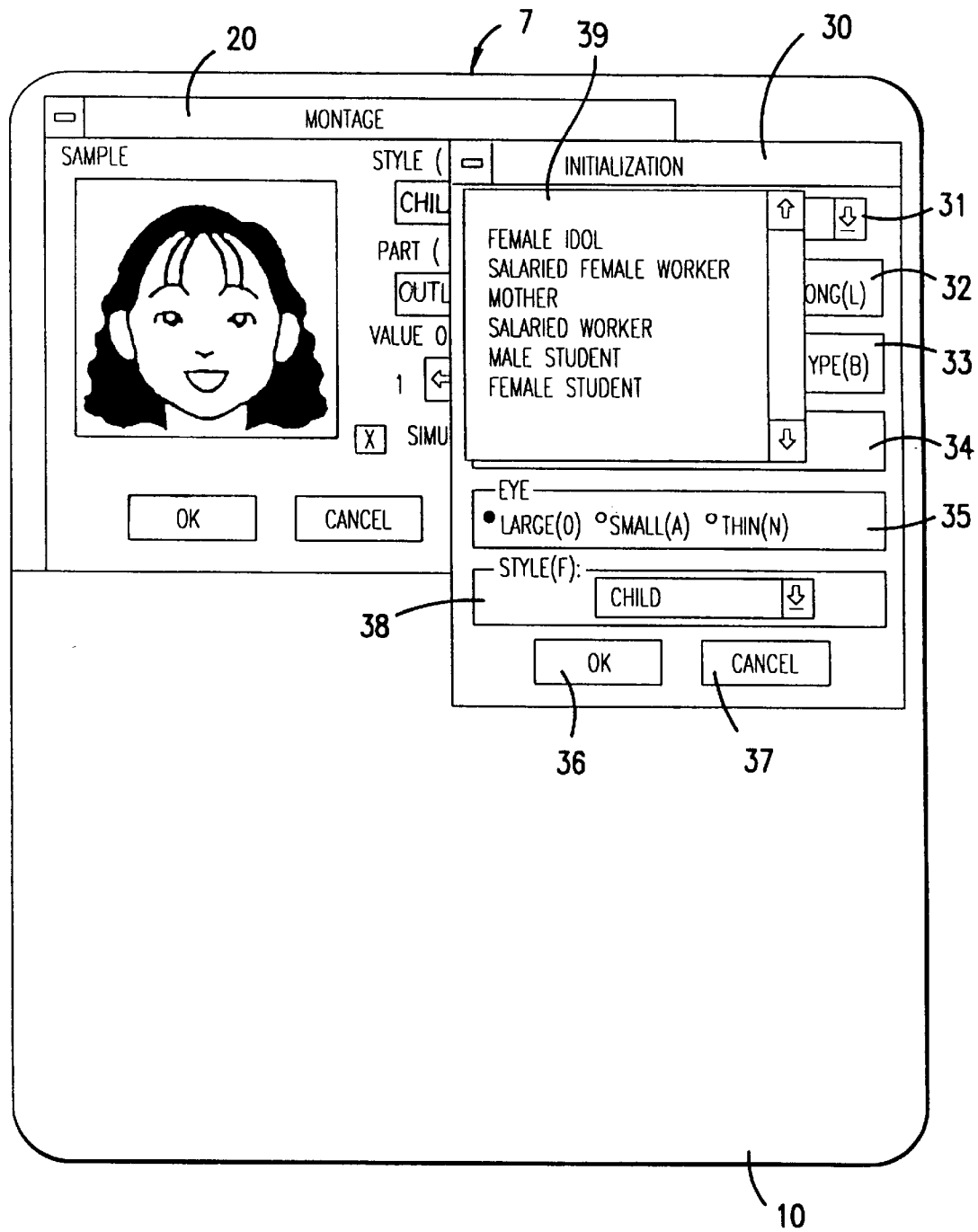
FIG. 15 represents an initialization screen in the embodiment.

The reference example setting column is a column to display the result of selection in selecting a character out of a large number of characters such as a "female idol," a "female salaried worker," a "mother," a "salaried worker," a "male student," and a "female student." The selection of a character is executed by moving a mouse cursor to the reference example setting column 31 and executing a right click or by inputting the numeral of a character number such as 1, 2, 3, by a numeral key 3MN. A third way of selecting a character is also provided. When the left side button of the mouse 5 is depressed two times in a short time (hereinafter referred to as a double click), a character table 39 is displayed and a character can be selected from the table 39 (FIG. 15).

When a specific character is selected in the reference example setting column 31, the attributes of a hairdo pattern, an outline of a face, an eyebrow, and an eye for the selected character are automatically selected. In the embodiment, three types of a hairdo pattern or attribute, "short," "semi-long" and "long" are available for selection and the hairdo patterns are numbered in relation to the pattern. Hairdo patterns from number 1 to number n, belong to the category of "short," those of number (n+1) to k (k>n) belong to the category of "semi-long" and those of number (k+1) to 1 (1>k) belong to the category of "long"; thus patterns are numbered according to the pattern type or attribute. As the attributes, or patterns, of a face, there are three types: "round face," "square face" and "home base type face." The attributes of an eyebrow are two types: "thick" and "thin"; and the attributes of an eye are three types of "large," "small" and "thin."

In the cases of the hairdo pattern setting column 32, the outline of a face setting column 33, the eyebrow setting column 34 and the eye setting column 35, the respective attributes can be changed independently of the character selected as a reference by moving the mouse cursor to any of the columns and executing a right click. However, after attributes are set in the setting columns 32 to 35, if the character selected in the reference example setting column 31 is changed, the attributes of the reference character being set by a default rule take preference and they are reset. In other words, the setting columns 32 to 35 will be used for fine adjustment after the character is selected as a reference example. When the attributes are set by key operation, the selection of the display column is designated by use of the upper or lower cursor key 3U,3D and the attributes are selected by use of the left or right cursor key 3L,3R.

The OK column 36 and the cancel column 37 function as switches for inputting the instructions "OK" or "cancel." The style selection display column 38 has the same function as the style selection display column 22 in the operating area screen 20. Even after an initialization changing process, the reference style of a face can be selected.

After the display of the initialization screen 30 as described in the above, the input from the mouse and the keyboard are taken in (B20) and one of the processes shown below is executed: a reference example setting process (B30: YES, B65), an attribute changing process of a hairdo pattern (B40: YES, B45), an attribute changing process of an outline of a face (B50: YES, B55), an attribute changing process of an eyebrow (B60: YES, B65), or an attribute changing process of an eye (B70: YES, B75). From the time when cancel is instructed until the present routine is passed through (B80: YES) or from the time when OK is instructed until initialization decision process is passed through (B90: YES, B100), the processes can be executed repeatedly.

In the initialization decisional process B100, a default pattern number is selected for each respective part based on the attributes being set about a hairdo pattern, an outline of a face, an eyebrow, and an eye, and the selected pattern is assembled into the montage picture. A montage picture plotting process (B110), as above, is then executed. Thereby, a new montage picture is plotted in the sample display column 21 based on the change of initialization.

When a montage picture is plotted, based on the change of initialization, it is confirmed whether the montage picture is OK (B120). When cancel is instructed, the next desirable combination of a hairdo pattern, an outline of a face, an eyebrow and an eye is newly selected (B130) and a montage picture plotting process is again executed (B110). When OK is instructed, the initialization screen is erased (B140) and the present routine is passed through.

In order to cultivate a better understanding of the contents of the processes B100 on, an explanation using examples will be presented.

It is assumed that the "female idol" is selected as a character in the reference example setting process. There are many kinds of idols in the category of female idols, for example, a singer "A Nakamori," an actress "H Yakushimaru" and so on. If an object person for making her montage picture looks like "A Nakamori," Nakamori's data will be initialized and fine adjustment for the respective parts will be performed; if the object person looks like "H Yakushimori" it is desirable to start from "H Yakushimaru." In the present embodiment, initialization makes it possible to answer such a demand as described above. However, if too many characters are provided for selection, for example, "A Nakamori," "H Yakushimaru," "M Kikuchi" and so on, the operability in setting a reference example will be degraded by too many choices.

Therefore, in answering such demands, and also in consideration of operability, it is arranged that following the decision of the attribute of initialization in step B100, the display can be changed to a next candidate, a candidate following the next, satisfying the condition in the initialization. Thereby, when an operator sets "female idol," he can easily select a likeness of a person being prepared as the first candidate "A Nakamori," the second candidate "H Yakushimaru," the third candidate "M Kukuchi" and so on, as a starting condition. It is also arranged to make it possible to select in step B130, not the next candidate, but the preceding candidate by giving a left click to the cancel column 37 or by depressing the shift key 3S together with the cancel key 3Z.

Figure 16A:
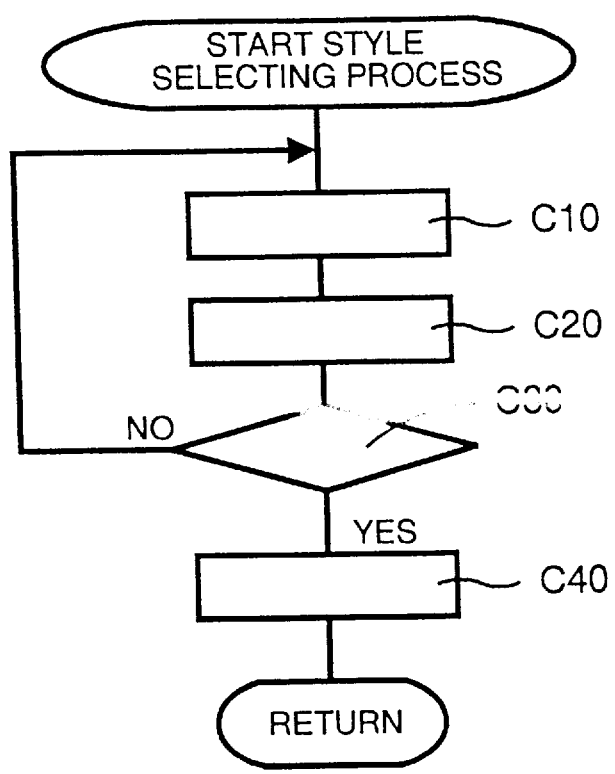
FIG. 16A is a flowchart showing a style selecting process in the embodiment.
Figure 17A:
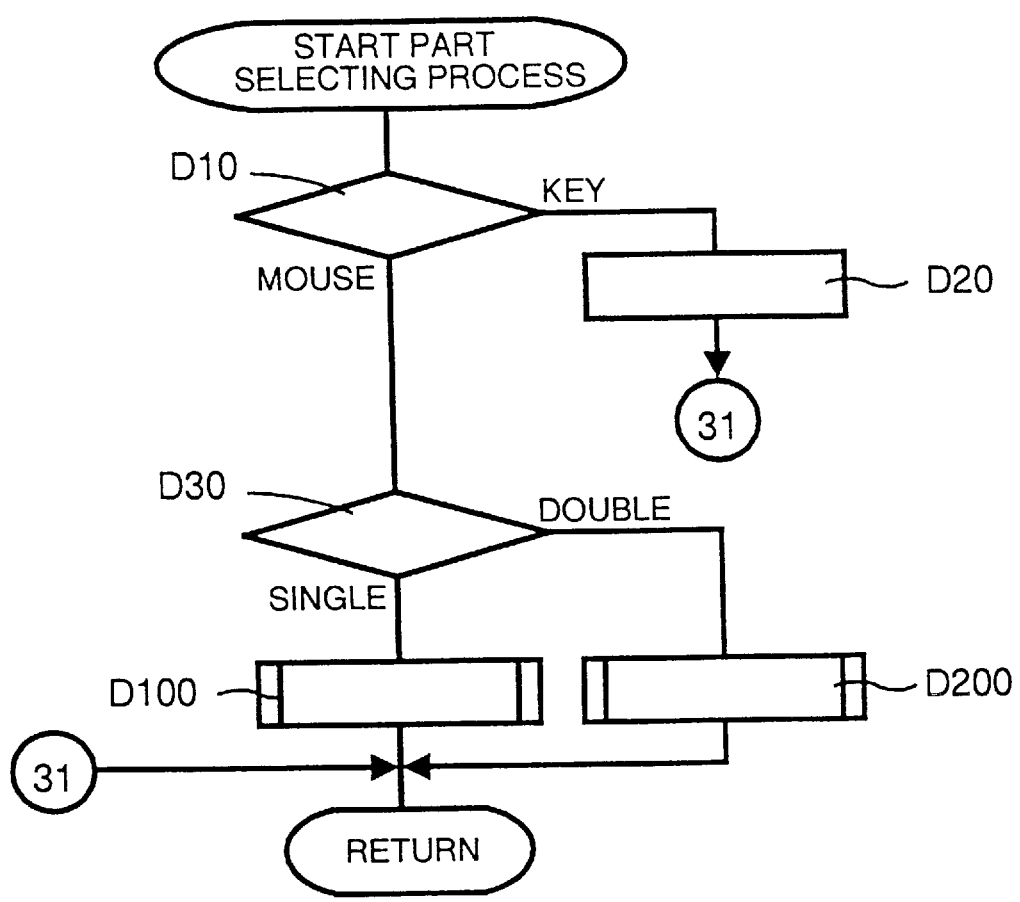
FIG. 17A is a flowchart showing a part selecting process in the embodiment.

Next, the style selecting process (S35), that is, selection of a face style, will be explained using FIGS. 16A,16B. The selection of a style can be executed in the initialization changing process, however the style selecting process (S35) is normally a process for selecting a style in the operating area screen 20 as shown in FIG. 5. In the process, the input from a mouse and a keyboard (C10) are taken in and a style is selected (C20). When OK is instructed, the style is decided (C30, C40).

The part selection process (S45) will be explained using in FIGS. 17A to 19B. When the part selecting process is started, it is judged whether the selection of a part is performed by a key input or a mouse (D10). In the case of the key input, a part is selected according to the instruction of the upper or lower cursor key 3U,3D (D20). On the other hand, in the case of the mouse input, it is judged whether the instruction is a double click (depression of the button on the mouse 5 two times in a short time) or a single click (depression of the button on the mouse 5 once) (D30), and when the instruction is a single click, the process moves to a single click process (D100) and when the instruction is a double click, the process moves to a double click process (D200).

Figure 18A:
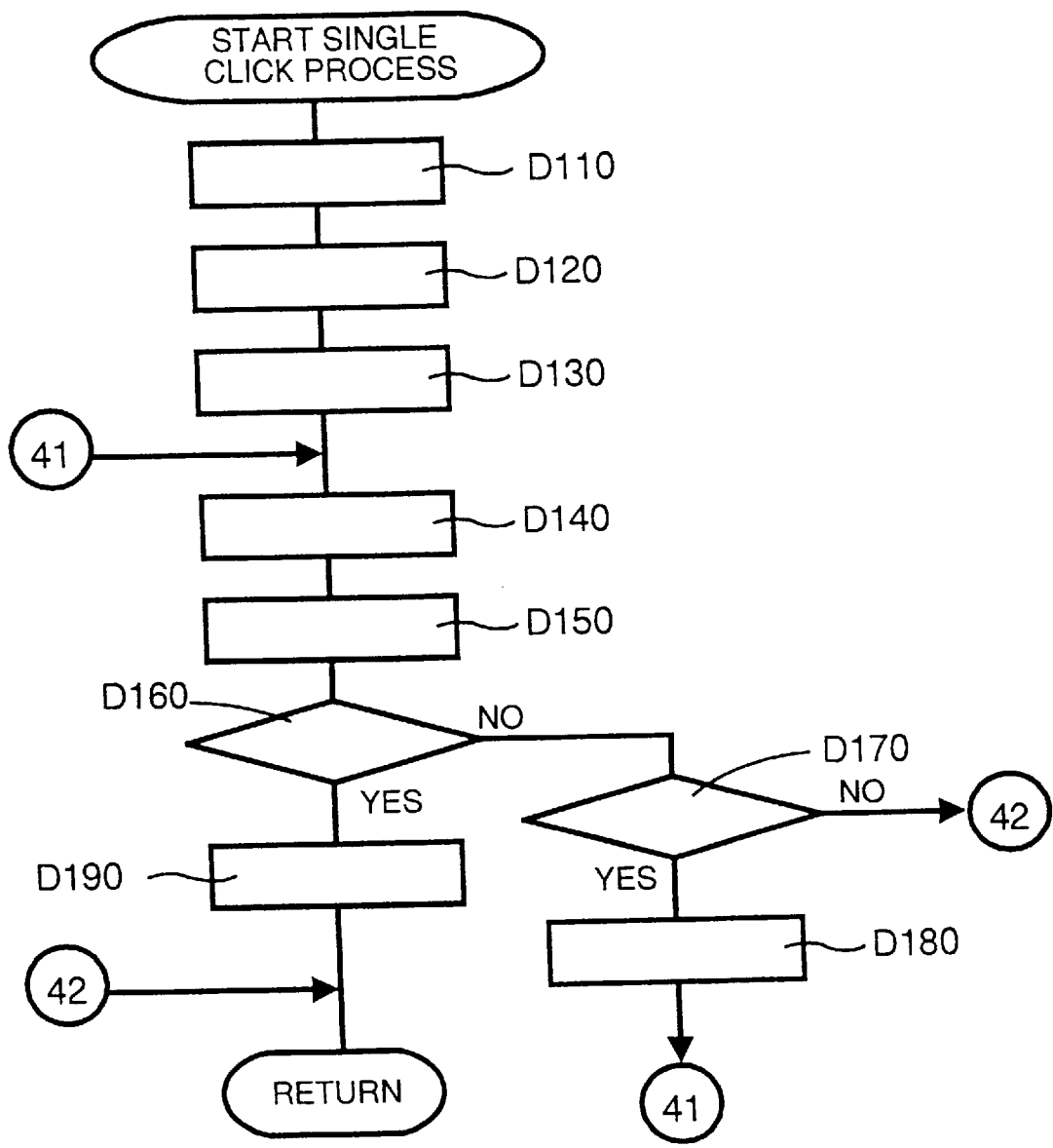
FIG. 18A is a flowchart showing a part selecting process in the embodiment.
Figure 19A:
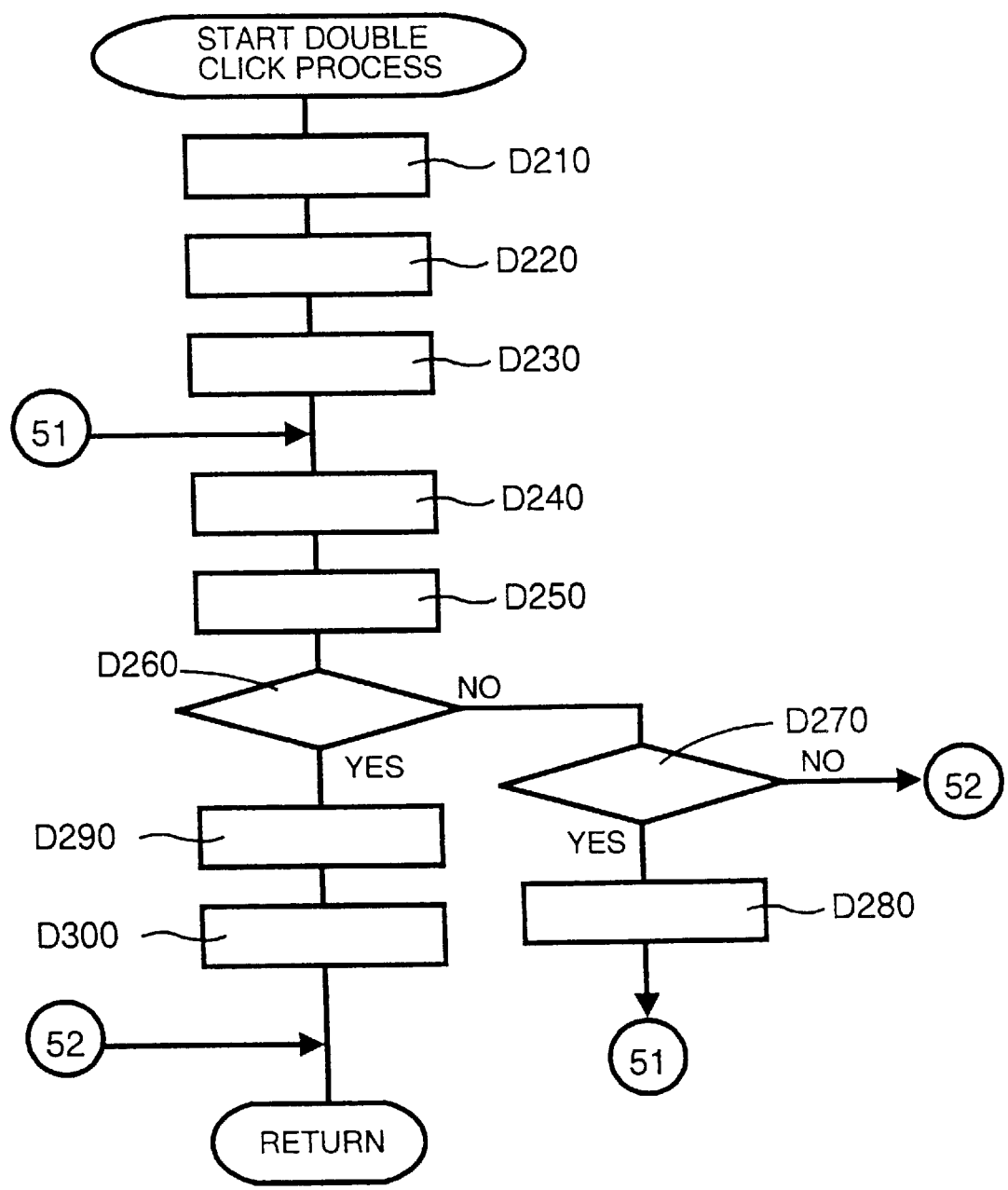
FIG. 19A is a flowchart showing a part selecting process in the embodiment.

In the case of the single click process, as shown in FIGS. 18A,18B, the data of coordinates on the display at a click point (the position of a mouse cursor at the time of the click) are taken in (D100). In the same way as step A20 in the montage picture plotting process, the whole occupation area of the montage picture, that is, the whole area of the sample display column 21 is acquired (D120).

Next, although the montage picture may be thought of as layered from back to front, i.e., from hair to nose, the object part for selection, that is, the part being positioned, is treated as the most front part in the face during positioning (D130). If spectacles are used as a part, and eyes selected, the eyes are set as if they are positioned in front of the spectacles.

Next, the original occupation area of the object part being selected is contracted in proportion to the ratio of the original whole area to the whole area acquired in step D120 and the data of coordinates of the contracted area are calculated (D140). The process in step D140 is the same as that in step A50 of the montage picture plotting process.

Next, the coordinate data on the display, when the contracted occupation area of the object part for selection in step D140 is displayed in the sample display column 21 are calculated (D150). It is judged whether the coordinate data acquired in step D150, are overlapped with the coordinate data of the mouse click point taken in step D110 (D160). When it is judged that they are not overlapped with each other, it is judged whether there is a part behind the part being set at present (D170). If there is, the object part for selection is reset in the position of a part behind it, and the step of process returns to D140 (D180). Until a part which is judged "YES" in step D160 is found, the processes of step D140 to D180 are repeated. On the other hand, when it is judged "YES" in step D160, the name of the object part for selection is displayed in the part selection display column 23 in the operating area screen 20, and a state where the pattern selection of the part is possible is set (D190).

Figure 20:
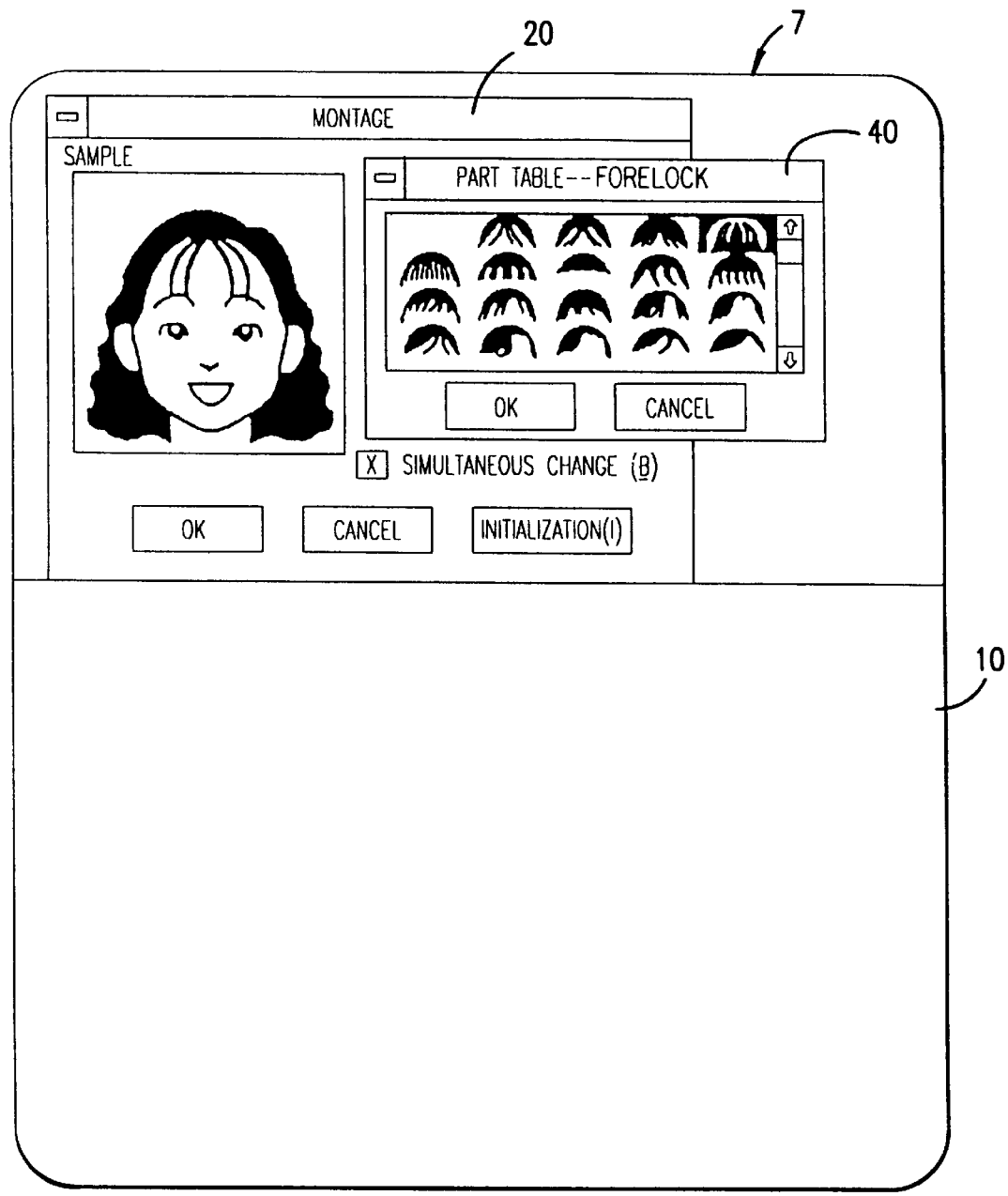
FIG. 20 shows a screen during the part selecting process in the embodiment.

In the case of a double click process, processes having the same contents as those in steps D110 to D180 are executed (D210 to D290). Following the process in step 290, as a distinction of the double click process, for example, a pattern table 40 as shown in FIG. 20 is displayed overlapping the operating area screen 20 (D300). The figure is the same as the table when the forelock is selected as a part.

Figure 21A:
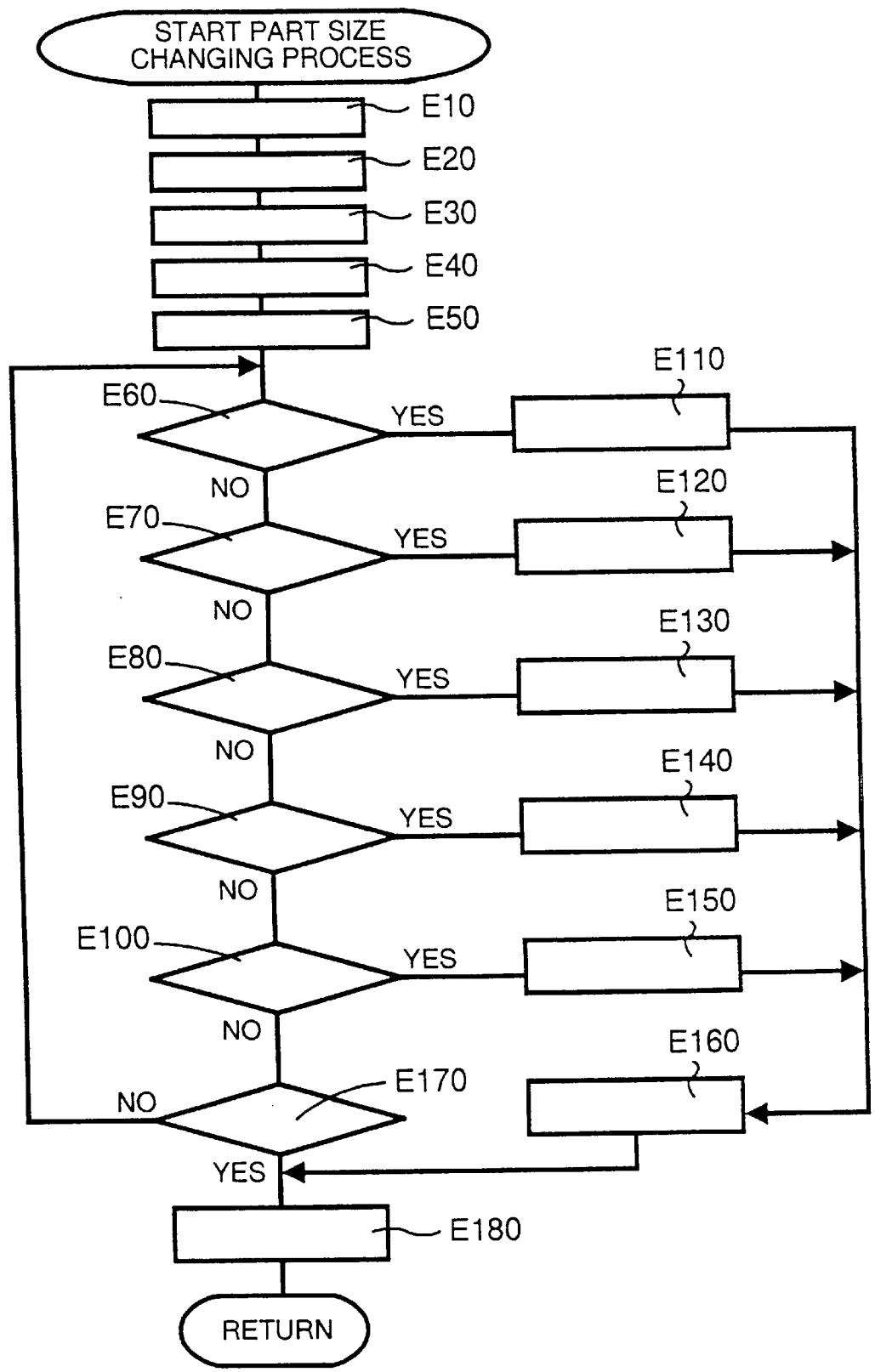
FIG. 21A is a flowchart of a part size changing process in the embodiment.

Next, the part size changing process (S55) will be explained using FIGS. 21A,21B. At first, the operation of a mouse is read, and it is specified what part is designated as a part to be changed (E10). The specification is performed by using the relationship of overlap between the click point and the occupation area of a part in the same way as in the case of the steps D110 to D180 described above. When a part to be changed is specified, an original occupation area of the object part to be changed is acquired (E20). When the left eye of a child is designated, a rectangular area denoted by PAeyeL in Table 1, that is, (212, 198) and (299, 247) is acquired.

Figure 22A:
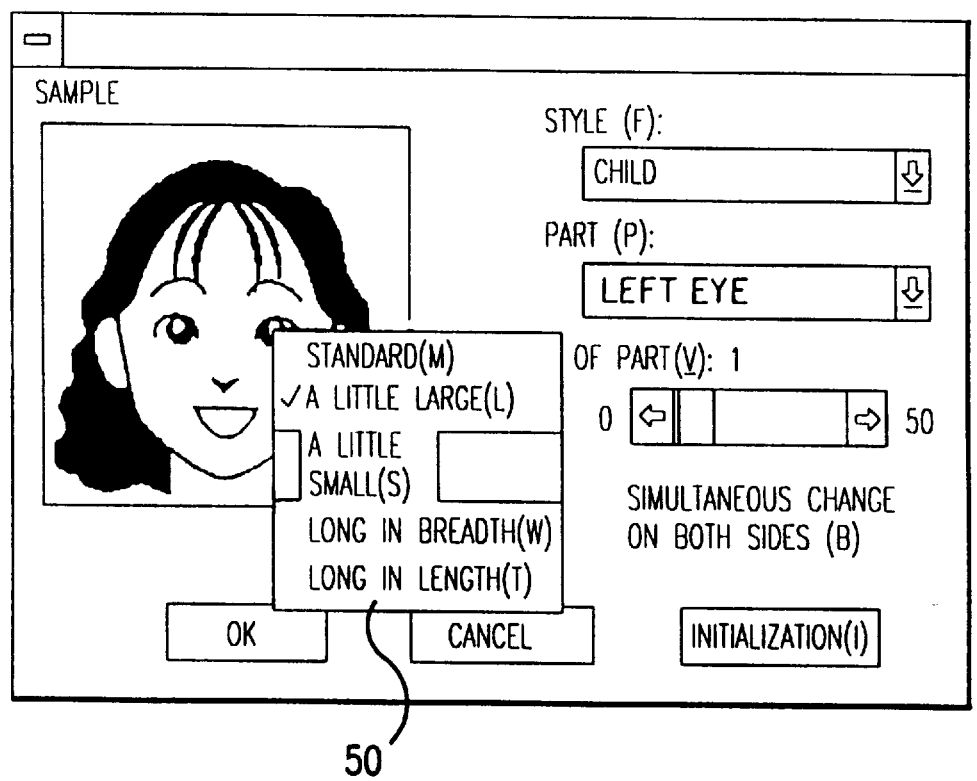
FIGS. 22A–22B illustrate a screen during the part size changing process in the embodiment.

Next, a part size changing process menu 50 is displayed as shown in FIG. 22A (E30). At this time, the present occupation area is compared with the original occupation area and the present state is checked (E40), and the present state is marked, in the menu 50 with a check mark (E50). A state where sizes of eyes have been changed to a little larger state than that in the original occupation area is shown in FIG. 22A.

Next, it is judged what state in the menu 50 is selected by the operator based on the operating state of the mouse and/or key (E60 to E100), and the occupation area is changed to the respective size (E110 to E150). Specifically, in the "standard," the occupation area is returned to a rectangle of the original occupation area (E110), in the "a little large," the original occupation area is enlarged to a rectangle having both length and breadth of 1.2 times of those of the original occupation area (E120), in the "a little small" the original occupation area is contracted to a rectangle having both length and breadth of 0.8 times (E130), in the "longer in length" the original occupation area is changed to a rectangle having the length of 1.2 times and the breadth of 0.9 times (E140), and in the "longer in breadth" the original occupation area is changed to a rectangle having the length of 0.9 times and the breadth of 1.2 times.

When the occupation area is changed, as described above, the occupation area is renewed to the state where the area center of the occupation area before the change and the area center of the occupation area after the change are made to coincide with each other (E160). Then, the part size changing menu 50 is closed (E180). If a cancel control is executed before a state, such as the "standard", is decided, the menu 50 is closed without executing the renewal of an occupation area (E170, YES).

Figure 22B:
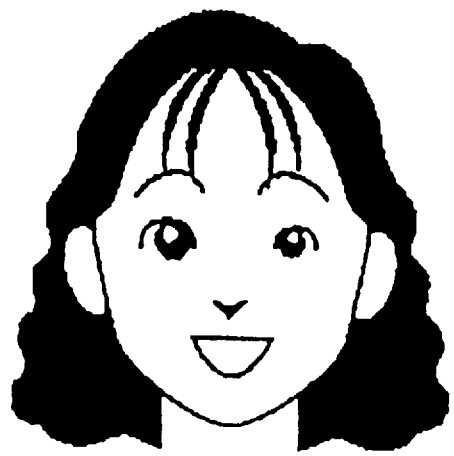

When the execution of the part size changing process is executed, as shown in the main routine (FIGS. 6A,6B), the montage picture plotting process (S10) is executed. FIG. 22B shows an example in which the left eye was selected as an object part for changing size and only its size was changed to "a little small" from the original state where both eyes had been set in the size of "a little large."

Figure 23A:
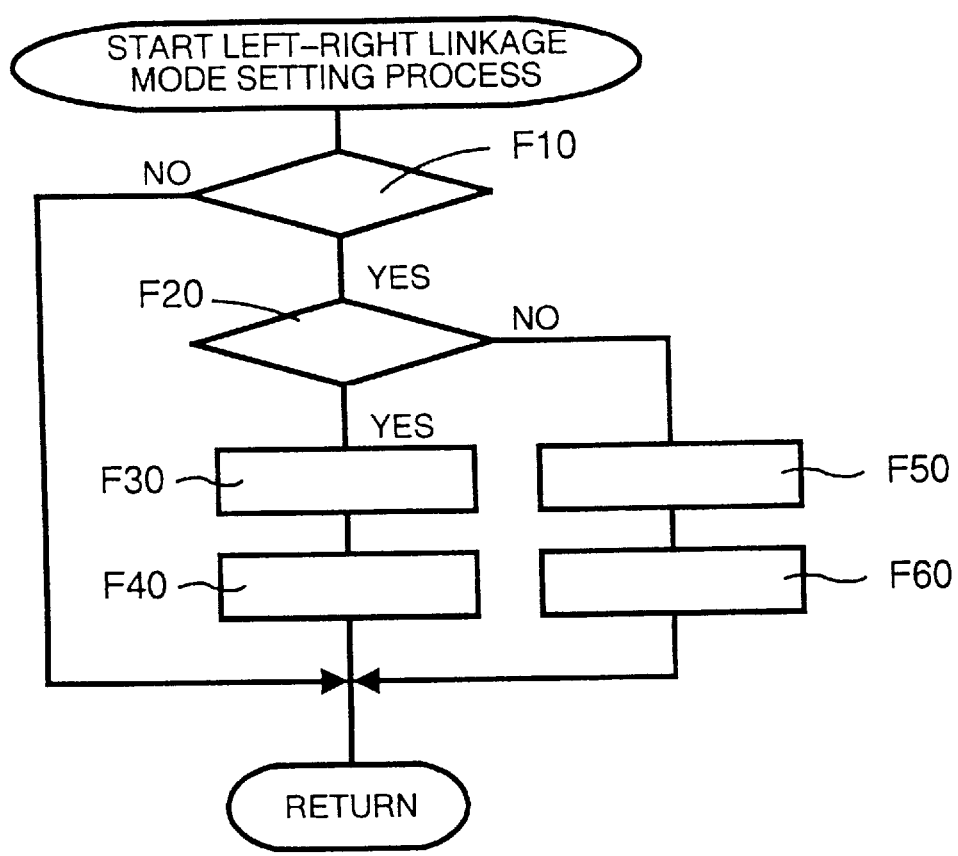
FIG. 23A is a flowchart of a setting process of a left-right linkage mode.

Next, the left-right linkage mode setting process (S65) will be explained. The process is shown in FIGS. 23A,23B.

At first, it is judged whether the mode change is instructed (F10). The judgment in F10 becomes "YES" every time when the display column of the left-right linkage mode is clicked by a mouse or a left-right linkage key 3X is depressed. It is then judged whether the preceding mode is a linkage mode (F20). If the preceding mode is the "linkage mode," the mode is changed to the "non-linkage mode" (F30) and a check mark in the left-right linkage instruction column 25 is erased (F40). On the other hand, if the preceding mode is the "non-linkage mode," the mode is changed to the "linkage mode" (F50) and a check mark is given to the left-right linkage instruction column 25 (F60). In addition to providing or removing the check mark, the data showing the result of the above operation are stored in the RAM.

Figure 24A:
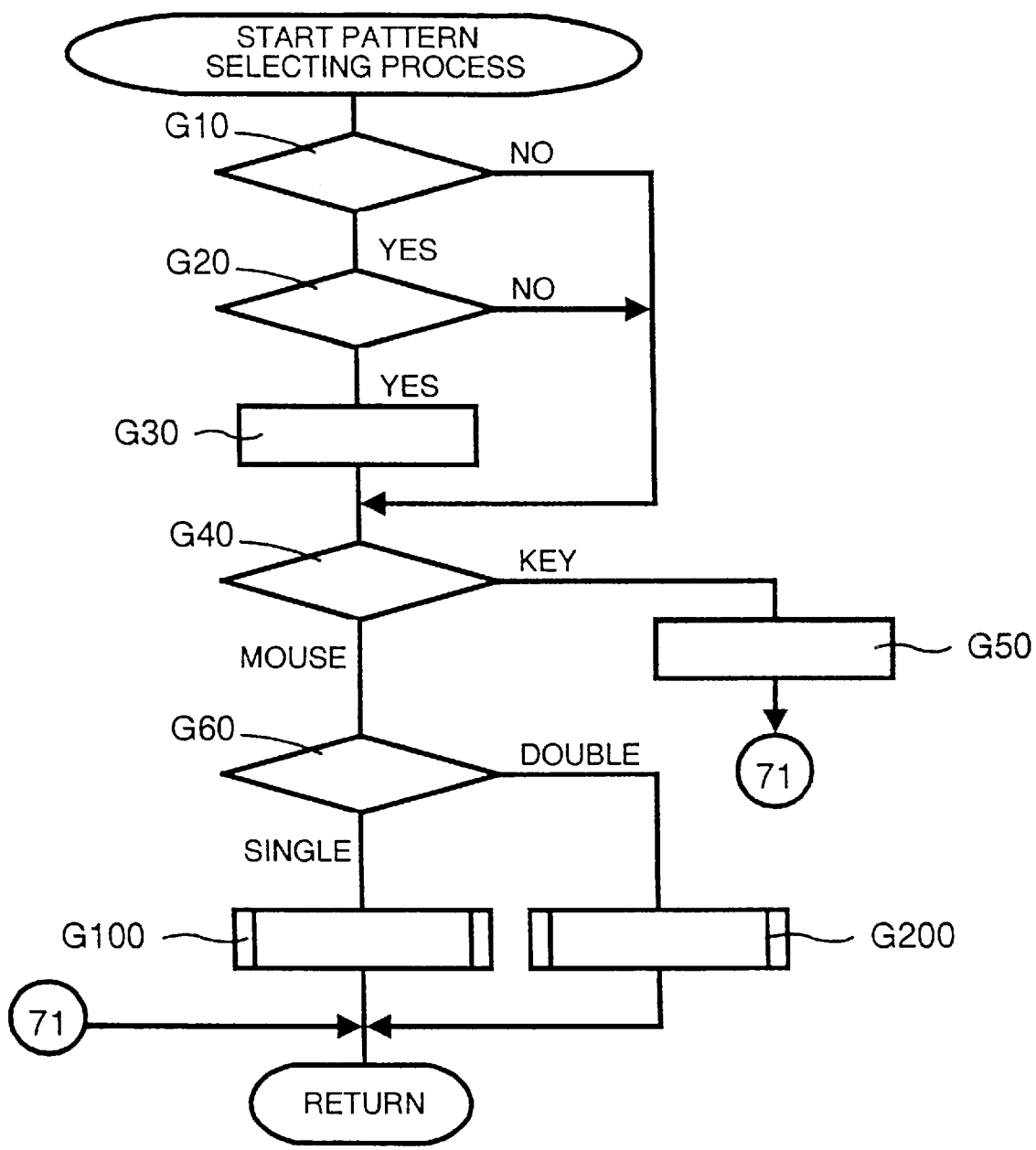
FIG. 24A is a flowchart of a pattern selecting process in the embodiment.

Next, the pattern selection process (S75) will be explained using FIGS. 24A,24B. At first, it is judged whether the object parts for pattern selection are "eyes" or "ears" (G10). In the case where the judgment is "YES," it is judged whether the left-right linkage mode is set based on the data stored in the RAM (G20). When the left-right linkage mode is set (G20:YES), a twin part is also compulsorily set to be an object part for pattern selection (G30). That is, when the linkage mode is ON, for example, if a "right eye" is set as an object part for pattern selection, the "left eye" is also compulsorily set to be an object part for selection, and the following process is executed. On the other hand, when the left-right non-linkage is set (G20: NO) or a part other than an "eye" or an "ear" is selected (G10: NO), the processes of step G40 and downward are executed for the selected part.

In G40, it is judged whether selection of a pattern is performed with key input or a mouse. In the case of the key input, as described above, the pattern is selected according to the instruction with the left or the right cursor key 3L,3R (G50). In the case of the mouse input, it is judged whether part selection is performed using a double click or a single click process (G60). In the case of selection of the single click process, the process moves to the single click process (G100) and in the case of selection of the double click, the process moves to the double click process (G200).

Figure 25A:
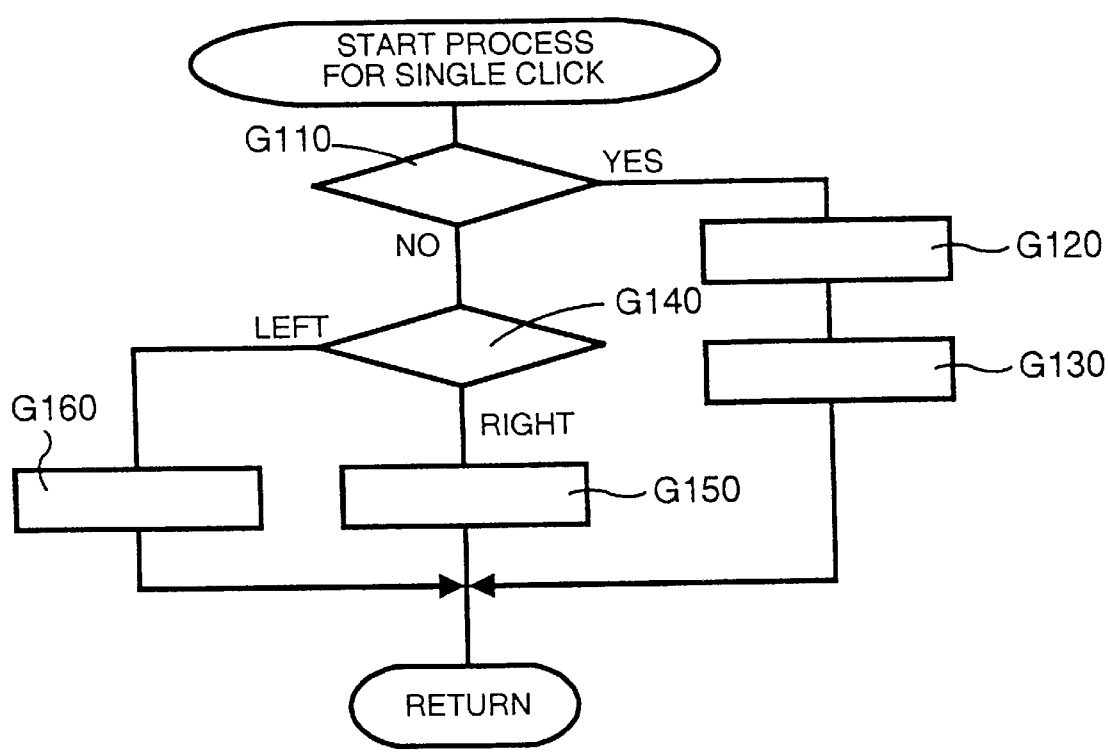
FIG. 25A is a flowchart during a pattern selecting process in the case of a single click in the embodiment.

In the single click process, as shown in FIGS. 25A,25B, it is confirmed that the mouse cursor is moved to the pattern value display column 24 (G110). When the mouse cursor is moved to the pattern value display column 24, a scroll bar is moved corresponding to the click-drag operation of the mouse (G120). Releasing the click-drag stops operation of the scroll bar and the pattern value is decided simultaneously (G130).

On the other hand, when the mouse cursor is not moved to the pattern value display column 24, it is judged whether the mouse is right clicked or left clicked (G140). In the case of a right click, the pattern value is incremented (G150) and in the case of a left click, the pattern value is decremented (G160). In steps G150, G160, the position of the slider in the pattern value display column 24 is moved corresponding to the increment or the decrement. When a pattern value reaches a maximum value by the increment, it moves to a minimum value by the next right click and the value is again incremented. A similar result occurs in the case of the decrement. As described above, when a pattern value is decided in steps G130, G150 or G160, the routine is finished, and the montage picture plotting process, as shown in step S10, is executed and the pattern selected at present is replotted in the sample screen.

Figure 26A:
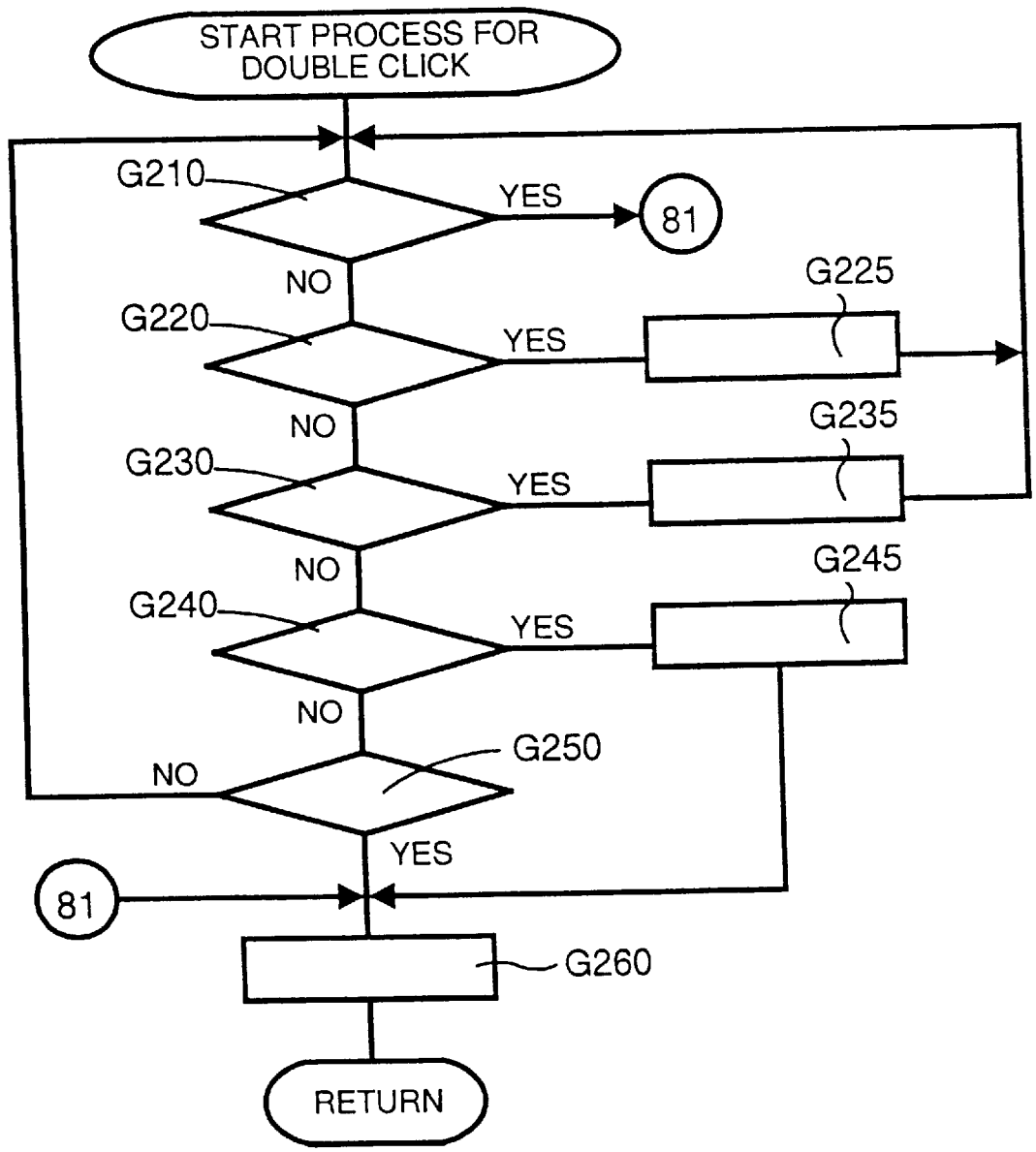
FIG. 26A is a flowchart during a pattern selecting process in the case of double clicks in the embodiment.

In the process of a double click, as shown in FIGS. 26A,26B, at first, it is judged whether the mouse cursor is clicked outside the pattern table 40 (G210). When the mouse cursor is clicked outside the pattern table 40, the table 40 is erased, and the present process is completed (G260).

On the other hand, when the mouse cursor is clicked inside the pattern table 40, it is judged whether the click point is on a pattern, on the scroll bar, or on the OK or cancel switch (G220, G230, G240, and G250). When the cursor is on the pattern, the pattern value of the pattern is adopted as a candidate for selection (G225). When the cursor is on the scroll bar, the contents of the table are scrolled (G235). When the cursor is on the OK switch, the pattern value being selected as a candidate is adopted, and the renewal of the pattern value and the positioning of the slider in the display column 24 are executed (G245), the table is erased (G260), and the present routine is completed. When the cursor is on the cancel switch, the table is erased (G260) without renewing the pattern value, and the present routine is completed.

As described above, in the selection process of a pattern involving twin parts, since either the linkage mode or the non-linkage mode can be adopted, there are such effects as shown below.

For example, when there is a pattern of a girl's face with eyes widely opened as shown in FIG. 27A, if the non-linkage mode is set and the left eye pattern is changed to a pattern of a closed eye, it is possible to obtain a pattern of a face that is winking, as shown in FIG. 27B. On the other hand, if a linkage mode is set and the left eye pattern in the state shown in FIG. 27A is changed to a closed eye pattern, the face pattern is changed to a face pattern of a girl with both eyes closed as shown in FIG. 27C. In both FIGS. 27B and 27C, the same closed eye pattern is selected as a pattern for the left eye, however, the faces of quite different expressions can be obtained by the difference between using the left-right linkage mode and the non-linkage mode. Only an eye pattern in a closed state is good enough to create the above mentioned faces of quite different expressions, and the quantity of patterns to be stored can be limited.

It is possible to create a winking face pattern without increasing the quantity of patterns using only the non-linkage mode; however when the expression shown in FIG. 27A is changed to the expression shown in FIG. 27C, the number of operations is increased if there is only a non-linkage mode.

In the case of the present embodiment, it is possible to switch a mode to a linkage mode, so that the expression shown in FIG. 27A can be easily changed to the expression shown in FIG. 27C without increasing the number of operations.

As described above, in the present embodiment, it is possible to create faces of various expressions without increasing the storage quantity of patterns and it is also possible to change expressions by keeping the symmetry of patterns of left and right eyes or ears without increasing the number of operations owing to the arrangement that the linkage mode can be switched over to the non-linkage mode and vice versa.

In the part selection process and the pattern selection process, it is possible to perform pattern selection by directly designating a part on the sample screen by the click operation of a mouse, so that an operator can designate a part whose pattern is to be changed without moving his eyes. In the single click process, patterns are successively displayed one after another by simply repeating clicks of a mouse so that an operator can monitor the patterns without moving his eyes and the image kept in his mind is not destroyed. As a result, operability is upgraded.

The apparatus is also able to display a pattern table 40 by using a double click process so that pattern selection can be performed to directly compare patterns having delicate differences, which upgrades the operability of the apparatus greatly. For example, it is effective in a case where the image of a person is clear to a certain degree but it is desirable to show a delicate shade of expression.

Figure 28A:
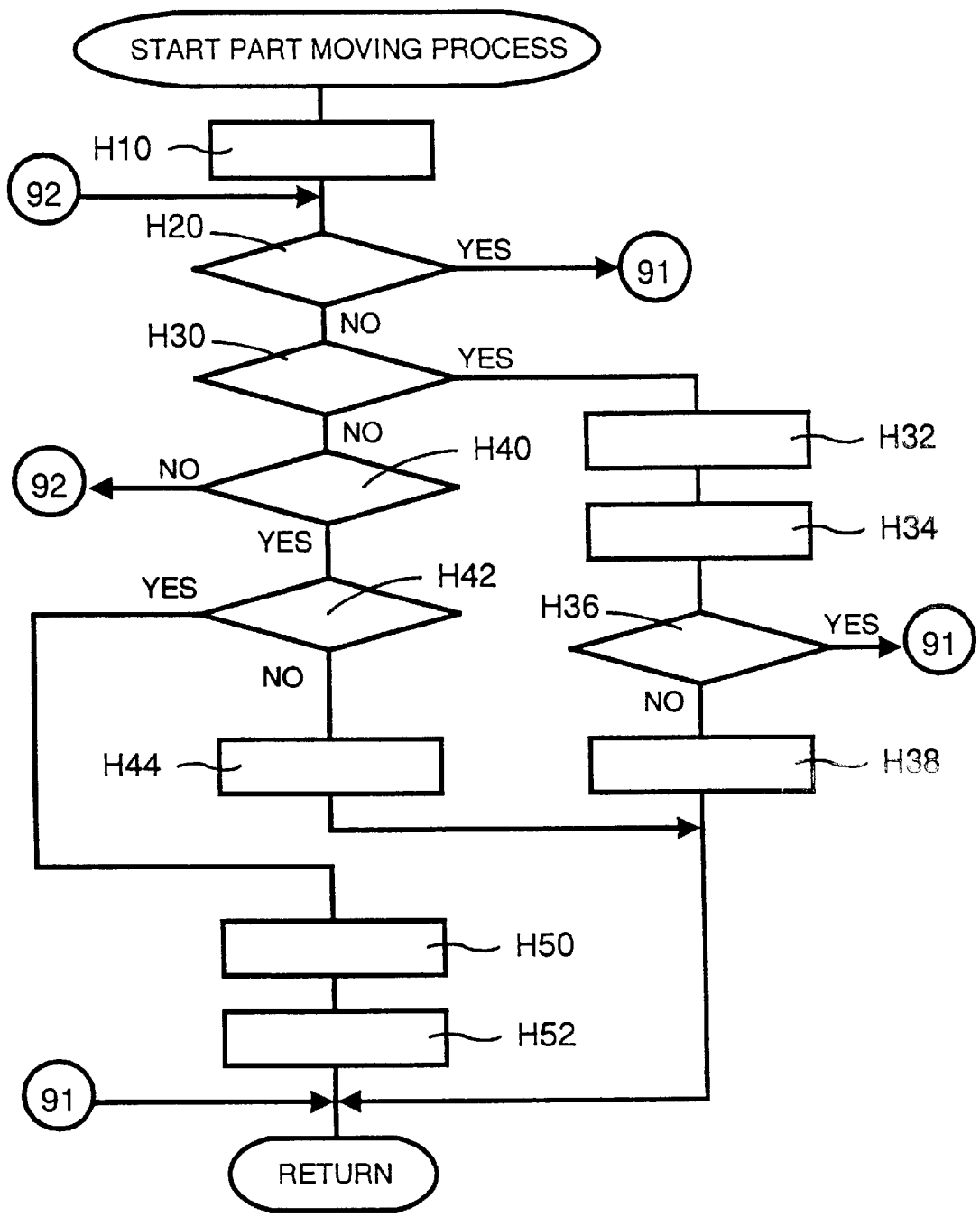
FIG. 28A is a flowchart of a part moving process in the embodiment.

Next, the part moving process (S85) will now be explained using FIGS. 28A,28B. In the part moving process, a limit is provided according to the kind of a part, so that, at first, the kind of an object part for movement is to be determined (H10).

When the determined object part for movement is a "hairdo pattern" or an "outline of face" (H20: YES), the routine is completed.

When an object part for movement is an "eyebrow," a "nose," a "mouth," or a "forelock" (H30: YES), the drag operation distance of a mouse is taken in (H32). The drag operation distance in the horizontal direction is made to be 0 regardless of movement (H34). The drag operation quantity in the vertical direction is first judged whether it is out of the outline of the face (H36). If it is out of the outline, it is treated as movement 0 and the present routine is completed as it is. Only when movement is not out of the outline, is the movement quantity in the vertical direction calculated (H38).

When the object parts for movement are "eyes" or "ears" on both sides (H40: YES), at first, it is judged whether the left-right linkage mode is set or not (H42). When the left-right linkage mode is OFF, that is, when the left-right non-linkage mode is set, the drag operation quantities of a mouse cursor in the vertical direction and the horizontal direction are calculated as the movement quantity of the part (H44).

On the other hand, when the left-right linkage mode is ON, the twin parts are set as object parts for moving to symmetrical positions on both sides (H50). In other words, when the linkage mode is ON, when a "right eye" is set as an object part for movement, a "left eye" is also set compulsorily as an object part for movement and it is moved to a symmetrical position with respect to the center line. In the following process, the movement quantities of parts on both sides are calculated (H52). Specifically, the components of the drag operation quantity of the mouse cursor in the vertical and horizontal directions are calculated as the movement quantity of a twin part designated by an operator as they are, and the operation quantity in the horizontal direction of a reversed sign is calculated as the movement quantity of the other twin part which is compulsorily designated as the object part for movement in step H50.

As described above, in the part moving process, the movable range is limited according to the kind of part. Because of this, even in a case where an unskilled operator drags a mouse carelessly during the movement of a part, the operator cannot cause the destruction of the relative locations of the parts.

Figure 29:
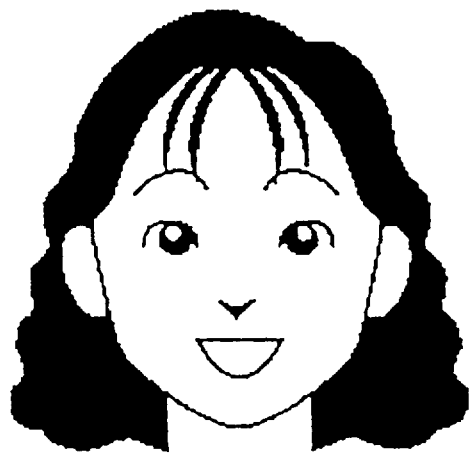
FIGS. 29A–29C represent a screen during the part moving process in the embodiment.
Figure 29:
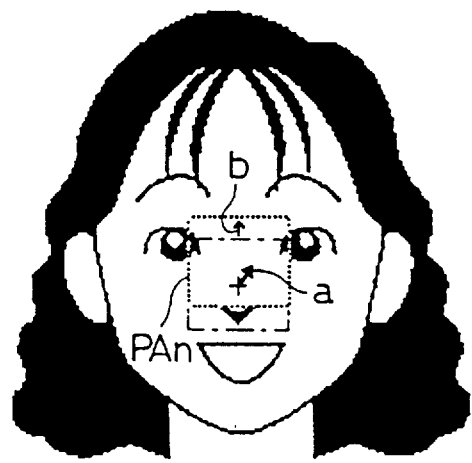
Figure 29:
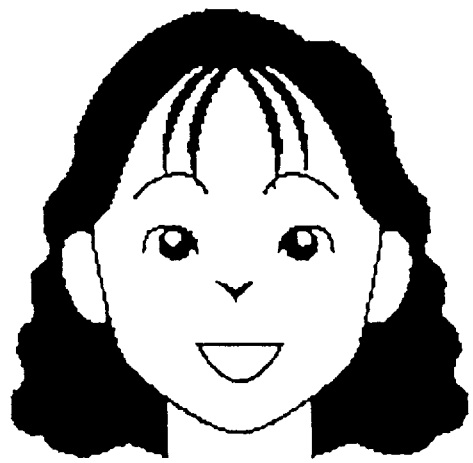

The operation mentioned above will be explained further referring to specific examples. When the operator wants to move the position of the nose a little upward as shown in FIG. 29C, from an original face as shown in FIG. 29A, even if the operator drags a mouse at an angle, as shown by the arrow a in FIG. 29B, the occupation area PAn of the nose can only move upward as shown by the arrow b. As a result, the operator is able to move the pattern of the nose without anxiety, even if not a skilled operator, and a smooth change of the dispositions of parts is possible.

Figure 30:
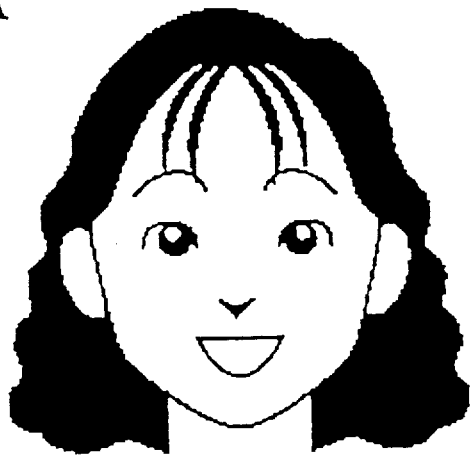
FIGS. 30A–30C represent a screen during the part moving process in the embodiment.
Figure 30:
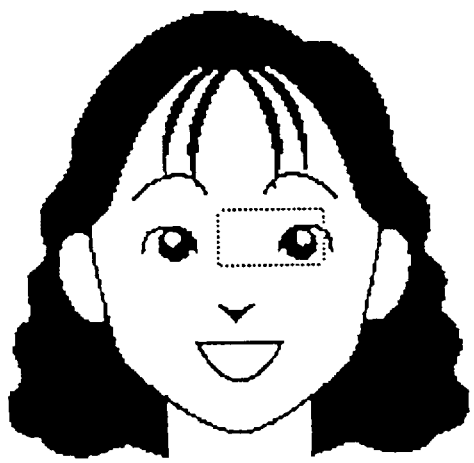
Figure 30:
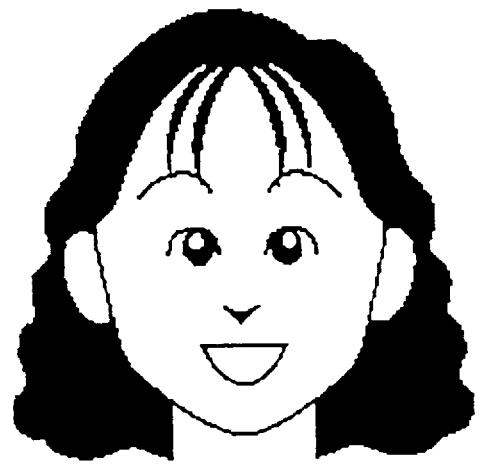

In the part movement process for the eyes and ears, the left-right linkage mode and the non-linkage mode can be switched over between one another; therefore, the effects as described below can be obtained. In the linkage mode, where a face, as shown in FIG. 30A, is to be changed to a face with a narrower interval between the eyes, as shown in FIG. 30C, the operation of moving a single eye, a very simple operation, is sufficient, as shown in FIG. 30B. Furthermore, since the eyes are disposed symmetrically, their relative positions are correct.

Figure 31:
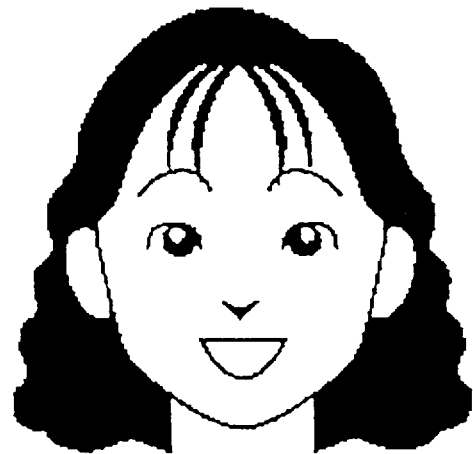
FIGS. 31A–31C represent a screen during the part moving process in the embodiment.
Figure 31:
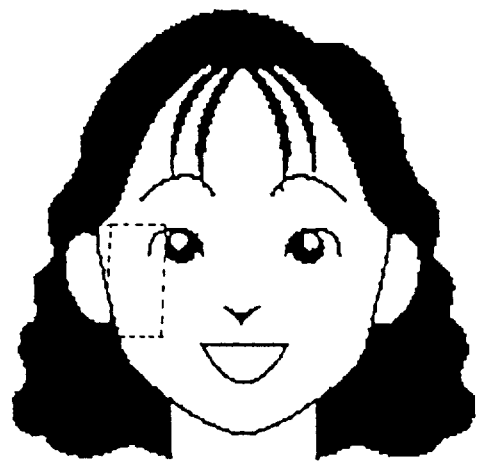
Figure 31:
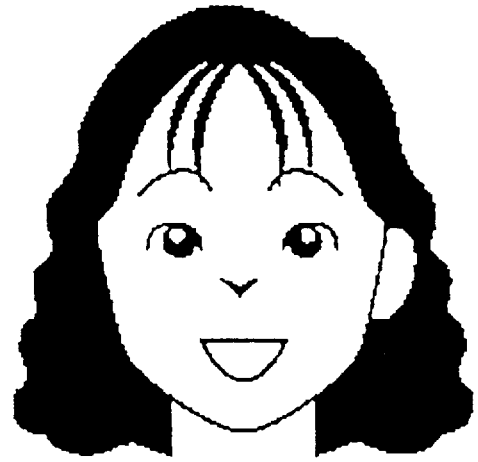

On the other hand, the effect obtained using the non-linkage mode can be easily understood by referring to the example shown in FIGS. 31A–31C. A pattern of a face in which only one ear is seen, as shown in FIG. 31C, can be easily obtained by moving only the right ear to be concealed behind the face. In this case, there is also an effect of decreasing the storage quantity of patterns, that is, a variety of expressions can be created without increasing the storage quantity for patterns similar to the case of creating a winking face.

Next, the processes from the montage picture decisional process (S95) to the output data registering process (S130) will be explained. As described above, the montage picture decisional process (S95) is executed by clicking the OK column 26 in the operating area screen 20 or depressing the OK key 3Y when the desired face pattern is obtained starting from the preceding montage picture data or from the revised preceding montage picture data obtained by the change of initialization through the operations of the selection of a style, the selection of a pattern, the movement of parts, the changes of part sizes, and so on. In the montage picture decisional process, the pattern values of the respective parts, the sizes of occupation areas and the dispositions of the respective parts selected at the time are stored in a storage device. The data will be acquired and set as the preceding montage picture data in the step S5 of the main routine in the next execution of making a montage picture.

Figure 32A:
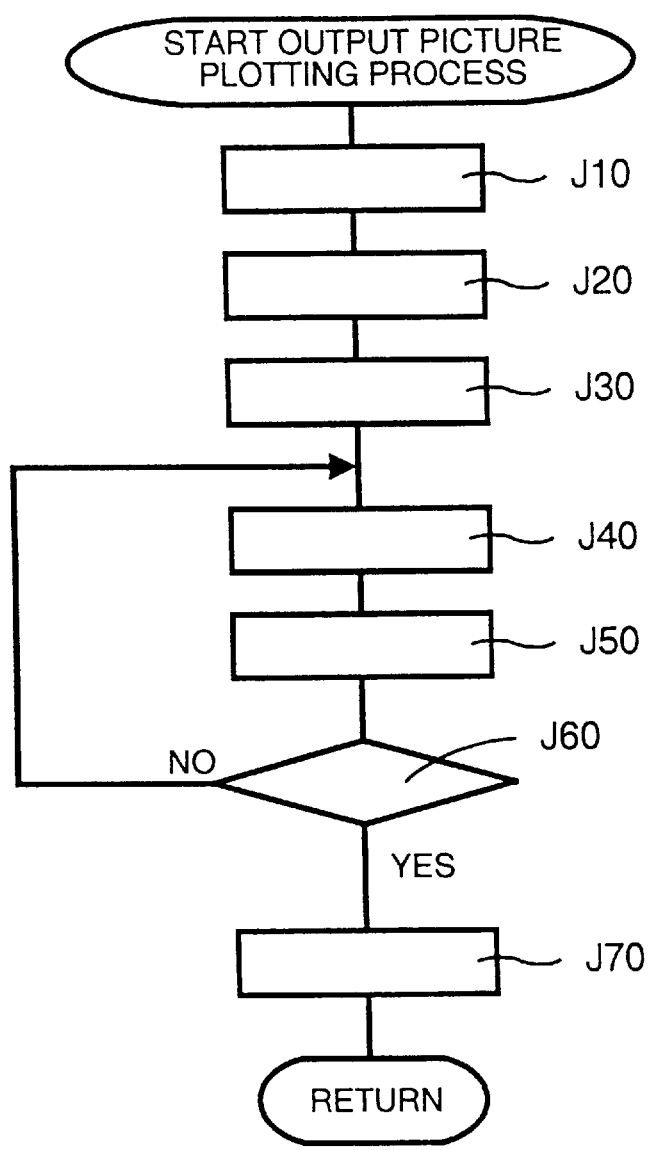
FIGS. 32A is a flow chart showing the output picture plotting process in the embodiment.

The output picture plotting process (S100), as shown in FIGS. 32A,32B, is the same process as the montage picture plotting process (S10). At first, the default value of a plotting area (in the embodiment: 128 dots×120 dots) is read (J10) and a bit-map data creation area corresponding to the plotting area is acquired and initialized (J20). Following this, the ratio of the plotting area to the original area of the montage picture (400 dots×400 dots) is obtained (J30), the parts are set in order from a back side part, that is from a hairdo pattern, the ears, an outline of a face, and so on (J40), and the outline data are converted into bit-map data by enlarging or contracting the sizes of parts (J50) corresponding to the ratio calculated in step J30. When the bit-map data of all parts are completed (J60), the final bit-map data of the whole face are transferred to a frame buffer for plotting, and a picture is plotted in the plotting area screen 10 (J70). Thereby, a montage picture is plotted in the plotting area screen 10 occupying the lower half of the display, at a dot density equal to that of the output to a tape writer.

Figure 33A:
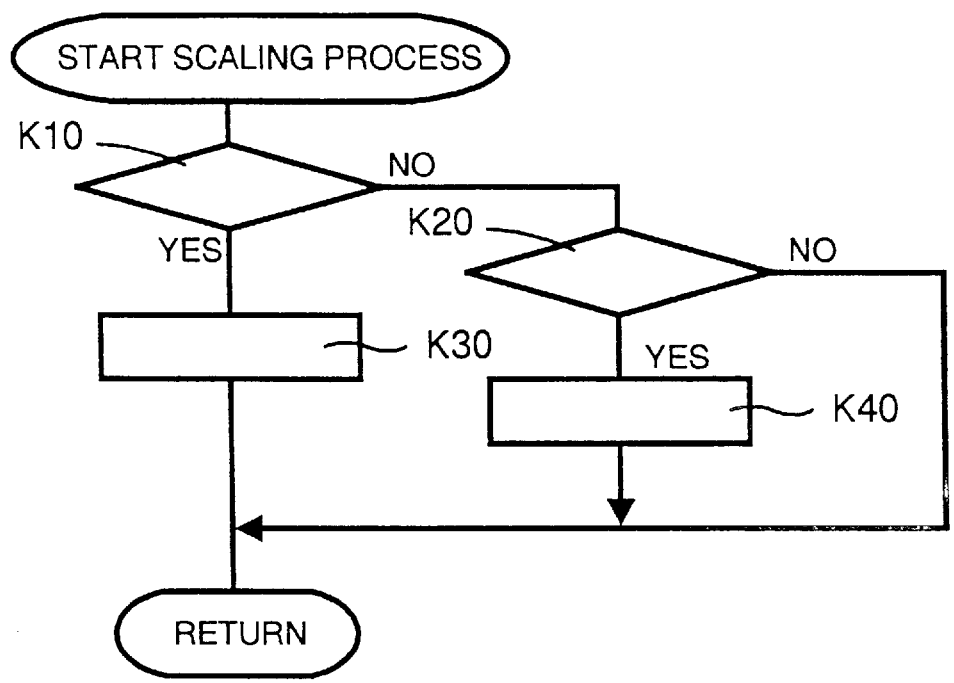
FIG. 33A is a flowchart of the scaling process in the embodiment.

In the scaling process (S120), the montage picture in the plotting area screen 10 is enlarged or contracted in similar figures. The details are as shown in FIGS. 33A,33B. At first, it is judged whether a designation for enlargement is given by a right click of a mouse or by depressing the right cursor key 3R (K10). If not, it is further judged whether a designation for contraction is given by a left click of the mouse or by depressing the left cursor key (K20). If neither, the process is completed. If it is judged "YES" in step K10, a predetermined number of dots in length and breadth are added to the present plotting area to enlarge the plotting area (K30) and the process is completed. If the judgment in step K20 is "YES," a predetermined number of dots in length and breadth are subtracted from the present plotting area to contract the plotting area (K40), and the process is completed.

After enlargement or contraction of the picture plotting area, the above mentioned output picture plotting process (S100) is executed, and a picture after enlargement or contraction is plotted in the picture plotting screen 10.

When a montage picture is enlarged or contracted to a size suited to an output medium intended by the operator and OK is input, the process is advanced to the output data registration process (S130) and the bit-map data for output are stored in a storage device. When the bit-map data are transferred to an output device, such as a tape writer or a laser printer, a montage picture is output on an adhesive tape or a sheet of paper as appropriate.

As described above, according to the present embodiment, the size of the montage picture can be enlarged or contracted to suit a final output medium. In the case of enlargement or contraction, since a method is adopted in which after the outline data are enlarged or contracted they are converted to the bit-map data, a montage picture of good quality can be obtained having no conspicuous notches.

Examples expressing the technical idea contained in the embodiment will now be described.

EXAMPLE 1

A montage picture making apparatus capable of showing delicate expressions of a montage picture with disposed parts having good balance or changing the ratio of length to breadth of a pattern to be capable of being used in a variety of ways, and capable of being used by an unskilled operator has a storage means for storing a plurality of patterns for respective parts, such as a hairdo pattern, an eye, a nose and a mouth; an occupation area decision means for determining the occupation areas for respective parts on the screen; a selection means for selecting a desired pattern of a desired part from the storage means; a display size decision means for deciding the display size of a pattern so that the pattern of a selected part can be adapted to the occupation area of the part in an appropriately scaled state; and a pattern display means for displaying the pattern in the occupation area determined for the part with the decided display size.

In the case of the montage picture making apparatus as described above, the occupation areas of the respective parts on the screen are determined by the occupation area decision means so that when the patterns of respective parts, such as a hairdo pattern, an eye, a nose and a mouth are selected, the display size decision means determines the display sizes of the patterns of respective parts so that they can be adapted to their occupation areas in the appropriately scaled states. The pattern display means displays the patterns of respective parts on the screen based on the display sizes. Thus, a montage picture is created.

Therefore, when an occupation area is decided, if the area is a rectangle for example, a pattern can be used to display a variety of expressions by changing the ratio of the length to the breadth. Thereby, it is possible to make montage pictures being rich in variation without increasing the storage quantity for patterns.

Since the shape of a pattern is decided according to the shape of the occupation area, when an occupation area is a rectangle for example, little skill is needed to decide the ratio of the length to the breadth, and the display mode of a pattern is unitarily decided by deciding the occupation area, so that there is no need to perform the difficult techniques described in European Patent Publication No. 584759.

In the montage picture making apparatus, it is desirable to provide the occupation area decision means with an occupation area stipulation means by face types which predetermines the balance among the occupation areas of respective parts according to the face type.

When a montage picture making apparatus is structured as described above, a face of an adult can be immediately changed to a face of a child by simply selecting a face type. In other words, at first a face type of an adult is selected and after that, patterns of parts are selected; then, display sizes are decided so that the patterns are adapted to their respective occupation areas in a predetermined state and the face of an adult is displayed; in this state, if the face type is changed to that of a child, even though patterns are not newly selected, the display is changed so that the respective patterns are adapted to the occupation areas for a child face type and the face is immediately changed to the face of a child. In such a mode as described above, a montage picture is made.

Therefore, interesting montage pictures can be created, for example from a face of an adult, the person's face as a child can be easily portrayed and suchlike. As a result, the use of the invention is able to answer a variety of demands of users.

Further in the montage picture making apparatus, it is desirable to provide the apparatus with an occupation area adjustment means for adjusting the positions of the occupation areas of the parts on the screen, or to provide the apparatus with an occupation area size adjustment means for adjusting the sizes of the occupation areas on the screen.

Owing to the structure described above, the degree of freedom in expression is further increased, for example, by changing the height or the interval of eyes, in expressing large eyes or small eyes using one type of an eye, and suchlike. The operation to lengthen or shorten the length or the breadth can be performed with a single operation of changing the occupation area; thus, the operability in the present embodiment is improved to be far better in comparison with that described in European Patent Publication No. 584759.

The patterns to be adapted to occupation areas can be expressed in the bit-map system, but it is further preferable to store the patterns of respective parts as outline data in the storage means, and to determine the display sizes so that the patterns of selected parts can be adapted to the occupation areas in the state of outline data in the predetermined state. In the case of outline data, even if the ratio of the length to the breadth is changed, the patterns finally displayed on the screen look beautiful without having notches caused by bits.

EXAMPLE 2

A montage picture making apparatus in which display quality is not deteriorated in enlargement or contraction and even if the capacity of patterns of parts is made small, a variety of expressions of faces can be obtained from a storage means for storing a plurality of patterns in the form of outline data for each part such as a hairdo pattern, an eye, a nose or a mouth; a selection means for selecting a desired pattern of a desired part from the storage means; and a montage picture display means for displaying a montage picture on the screen.

According to the montage picture making apparatus, a montage picture is displayed on the screen based on the outline data of patterns, so that even if the whole picture is enlarged the edges of dots are not conspicuous and even if it is contracted details are not lost.

In this montage making apparatus, it is preferable to provide the apparatus with an enlargement-contraction means for enlarging or contracting the selected pattern of the selected part in the state of outline data. In this case, for example, even if only a part is enlarged, the edges of dots in the display of the part do not differ from those of other parts being displayed in the standard magnification and the degree of conspicuousness of edges of dots in the whole picture is constant.

In the case of the montage picture making apparatus as described above, it is preferable that the montage picture display means is provided with a bit-map conversion means for converting the outline data of a pattern of the selected part into the picture display information in bit-map expression and a bit-map display means for displaying a montage picture based on the picture display information in bit-map expression.

When an operator intends to display a picture on a screen with outline data as it is; for example, as the operator experiences in CAD, the picture is displayed by lines drawn in order. Therefore, in particular when the operation to change the display for enlargement, contraction, movement, etc., the lines are drawn in order from the beginning, which irritates the operator. On the other hand, in the case where the apparatus is so constituted as described above in the invention, when a picture is displayed on a screen, since the picture is composed of bit-map data, the drawing of lines in order is not observed and the display is changed as if the screen is changed at a breath. Therefore, there is an effect that viewers are not irritated.

In this case it is preferable that the conversion means to bit-map data is provided with a picture changing range extraction means for extracting the range in which part of the whole picture is to be changed before and after the change of display when the operation of changing display is performed, such as the change of a pattern, enlargement, contraction, movement of patterns, and a partial conversion means to bit-map data which functions concerning only the extracted range, to form picture display information by bit-map expression concerning the above mentioned change, etc. It is also preferable that the bit-map display means is provided with a partial display change means for changing the display of a montage picture in the extracted range.

In the case where only an eye pattern is to be changed or moved, concerning a part which is not overlapped with the eye pattern, such as a mouth or a nose, the redoing of conversion to bit-map data is not needed, which makes it possible to shorten the time for a display change.

EXAMPLE 3

A montage picture making apparatus, in which the balance or positions among the parts in a face is not collapsed beyond a certain extent, has a storage means for storing a plurality of patterns for respective parts, such as a hairdo pattern, an eye, a nose and a mouth; a selection means for selecting a desirable pattern of a desirable part from the storage means; a montage picture display means for displaying a montage picture on the screen based on the selected pattern; and a display position change means for changing the position of a part to be displayed. The above mentioned display position change means includes a means provided with a degree of freedom decision means of position change for deciding the degree of freedom of position change corresponding to the kind of a part.

According to this montage picture making apparatus, it is possible to change the display positions of respective parts on the screen after the display of a montage picture on the screen based on the selected parts from respective parts, such as a hairdo pattern, an eye, a nose and a mouth. In the case of the change of a display position, the degree of freedom decision means for position change is operated, which makes the position change possible only in the range of the degree of freedom for a position change corresponding to the kind of a part. In other words, a position change exceeding the degrees of freedom is prohibited.

Specifically, for twin parts, such as eyes or ears, the degree of freedom decision means for position change is able to limit the degrees of freedom of parts in such a way that when a position of a twin part is changed, another twin part is forced to move to a symmetrical position. Thereby, a state is prevented where the balance in the heights of the left eye and the right eye is broken or where the right eye becomes closer to the center line than the left eye. In another example, the degree of freedom decision means for position change is able to limit the degrees of freedom of parts to be disposed on the center line such as a nose or a mouth in such a way that they are able to move only in the vertical direction. Thereby, such a case does not occur where a nose or a mouth is shifted to the left or the right.

Further, the degree of freedom decision means for position change is able to limit the degrees of freedom in such a way that the basic parts of a face, such as an outline of a face and a hairdo pattern, are prohibited from movement. In this case, the basic parts of a face, such as a hairdo pattern and an outline of a face are not erroneously moved.

It is also possible that the degree of freedom decision means for position change limits the degrees of freedom of parts to be positioned inside a face so they cannot be moved outside the face. In this case, even if an operator intends to move the eyes, for example, a large distance, they cannot be moved to the outside of the face.

As described above, the degrees of freedom of parts is limited corresponding to the kind of a part; thereby even if an operator carelessly instructs the movement of a part, the relative positions of the parts are not changed and the repositioning of the parts is also easy. Therefore, even an unskilled operator is able to change the disposition of parts freely in the optimum range of movement and the operation becomes simple.

EXAMPLE 4

A montage picture making apparatus, in which an expression of wink, is possible without increasing the capacity of a memory, and the movement or change of twin parts is simple, has a storage means for storing a plurality of patterns for respective parts, such as a hairdo pattern, an eye, a nose and a mouth; a selection means for selecting a desired pattern of a desired part from the storage means; and a montage picture display means for displaying a montage picture on the screen based on the selected pattern.

In the above mentioned selection means for the twin parts, such as eyes and ears, there are two modes, an independent selecting mode in which a part on one side can be independently selected and a simultaneous selecting mode in which both of the twin parts are simultaneously selected.

According to the montage picture making apparatus, in the independent selecting mode, the selection means can select a pattern on one side, such as an eye or an ear, so that there is no need to prepare patterns of both eyes in a wink state to express a wink state. On the other hand, in the case of the simultaneous selecting mode, eyes or ears on both sides can be simultaneously selected, and in the ordinary part selecting period, twin parts can be simultaneously selected during one selecting operation. Thus, the selecting operation is simplified.

Another montage picture making apparatus according to the invention has a storage means for storing a plurality of patterns of respective parts, such as a hairdo pattern, an eye, a nose and a mouth; a selection means for selecting a desired pattern of a desired part from the storage means; a montage picture display means for displaying a montage picture on the screen based on the selected pattern; and a display position change means for changing the display position of a part being displayed on the screen by the montage picture display means. The above mentioned display position change means for twin parts, such as eyes or ears, is so structured that two modes, an independent movement mode in which one twin part can be independently moved and a simultaneous movement mode in which both of the twin parts are moved simultaneously can be used by executing a changeover operation.

According to the montage picture making apparatus, in the independent movement mode, a variety of expressions is possible. For example, one eye can be disposed closer to the center line or the sizes of exposed parts of ears made different from each other. Moreover, there is no need to increase the storage capacity. On the other hand, in the simultaneous movement mode, the heights of eyes or ears on both sides can be changed simultaneously or the interval between eyes can be changed keeping symmetry with respect to the center line. Thus, complex operations can be avoided in the ordinary part moving operation.

EXAMPLE 5

A montage picture making apparatus, in which an initial picture is not fixed and can be selected out of a plurality of variations, having a storage means for storing a plurality of patterns for respective parts on a face, such as a hairdo pattern, an eye, a nose and a mouth in correlating the patterns with the characteristic information concerning the expressions of montage pictures; a privileged condition setting means for setting the characteristic information concerning the expressions of montage pictures including patterns to be selected with priority when the patterns of respective parts are selected from the storage means; and an initial picture display means for displaying a montage picture formed with selected patterns as an initial picture, the patterns which are selected as first candidates, at least concerning a part of parts, based on the contents set by the privileged condition setting means.

In the montage picture making apparatus as described above, the apparatus further having an initial picture changing instruction means for instructing the change of an initial picture; and an initial picture change means for changing the initial montage picture to the one formed with second candidate patterns which are reselected, at least concerning one part of the parts, as the second candidates satisfying the conditions set by the privileged condition setting means when the change of the initial picture is instructed by the initial picture changing instruction means.

According to the montage picture making apparatus noted above, when the characteristic information of a face of a certain type is set by the privileged condition setting means, the initial picture display means, at least concerning one part of the parts, selects a first candidate pattern based on the set contents and displays a face as an initial picture. In this case if the image of the initial picture is different from the expected one, the change of the initial picture is instructed by the initial picture changing instruction means. Then, the initial picture change means reselects patterns, at least concerning one part of the parts, as the second candidate pattern which satisfies the condition set by the privileged condition setting means and the initial picture is changed to the one formed with the parts of the second candidate pattern. After an initial picture which is closest to the expected image is displayed, the process is moved to the change of respective parts. In the result, an initial picture can be selected with a certain degree of flexibility, and a montage picture which matches to one's image can be made faster than ever.

In the case of the above mentioned montage picture making apparatus, it is preferable that the initial picture changing instruction means is capable of instructing an initial picture to return to the preceding picture and the apparatus is provided with an initial picture reversing means which returns an initial picture to the preceding initial picture when it is instructed to do so.

Since there is no absolute scale to judge whether a picture is closest to an expected image, operability of an apparatus can be upgraded by the arrangement to make an initial picture to be switched immediately to the next candidate and also to the preceding candidate.

As described above, in the case of a montage picture making apparatus according to the invention, not only the characteristic information for selecting in priority order the respective parts is set but also an initial picture itself can be selected with some flexibility. Therefore, when the apparatus is compared with the technique described in Japanese Laid-open Patent Publication No. 4-338877, in which only the priority order of patterns can be decided, in the case of the invention, it is possible to bring the starting condition of making a montage picture close to one's image easily. Thereby, operability is improved remarkably and even an unskilled operator can reach a desirable montage picture in a short time.

EXAMPLE 6

A montage picture making apparatus in which patterns can be selected without destroying the basic image having a storage means for storing a plurality of patterns of respective parts, such as a hairdo pattern, an eye, a nose and a mouth; a selection means for selecting a desired pattern of a desired part from the storage means; and a montage picture display means for displaying a montage picture on the screen based on the selected patterns.

In the above mentioned montage making apparatus, the selection means includes one which has an arbitrary point specification means for specifying an arbitrary point on the screen displaying the montage picture; a part discrimination means for discriminating a part corresponding to the specified point from others based on the corresponding relations between the point specified by the arbitrary point specification means and the displayed positions of respective parts composing the montage picture; and a selection start means which makes the start of selection of patterns from the storage means possible concerning the parts discriminated by the part discrimination means.

In the case of the montage picture making apparatus, when an arbitrary point on the screen is specified by the arbitrary point specification means, the part discrimination means discriminates the part corresponding to the specified point from other parts based on the corresponding relationship between the specified point and each of these parts composing the montage picture. The selection start means makes it possible to start the selection of the part from the storage means based on the result of the part discrimination.

Therefore, an operator is able to specify a part having a pattern to be changed without moving his eyes from the screen and he can select an optimum pattern without breaking his image.

The selection start means in the above mentioned montage picture making apparatus, in which comparison between parts are easy when they are selected, includes one having a table display means for showing a table of pictures of patterns of the part for which the selection of patterns is made possible; a second arbitrary point specification means for specifying an arbitrary point on the screen displayed by the table display means; a pattern discrimination means for discriminating the pattern corresponding to the specified point based on the corresponding relationship between the point specified by the second arbitrary point specification means and each of the respective patterns shown in the table; and a pattern change means for changing the display of a montage picture based on the pattern discriminated from others by the pattern discrimination means.

In the case of the montage picture making apparatus as described above, the patterns belonging to a kind of part are displayed as a picture in a table, the part of which the start of pattern selection is allowed by the specification of an arbitrary point on the screen. A pattern corresponding to the specified point is discriminated based on corresponding relationship between the specified point and the displayed position of each of these respective patterns shown in the table. Thus, the display of a montage picture is changed.

As a result, an operator is able to select an optimum pattern by comparing patterns as pictures and a more preferable pattern can be easily selected.

EXAMPLE 7

The technical ideas, at least, shown in examples 1 to 6 can be combined as two or more ideas.

As described above, the embodiment according to the invention is explained. However, the invention is not limited to the embodiment. For example, an occupation area of a part or a part frame can be expressed with circles, not with rectangles and many other modifications can be made by those skilled in the art.

What is claimed is:

1. A picture making apparatus, comprising:

a display having a viewing area with a predetermined size;

storage means for storing a plurality of image elements, each image element having at least two different permutations;

first selecting means for selecting one of the plurality of image elements;

second selecting means for selecting one of the at least two different permutations when the image element has been selected;

occupation area designation means for designating occupation areas for each image element of the plurality of image elements in the viewing area;

first scaling means for scaling each selected permutation of each selected element to the viewing area; and combining means for combining the selected permutation of each selected element for viewing as a complete picture in the viewing area, wherein said picture making apparatus is further provided with a size adjustment means for an occupation area for adjusting the size of the occupation area and said storage means stores the patterns of respective image elements in the form of outline data, said first scaling means scaling the pattern of the selected permutation of the selected image element to its occupation area in the form of outline data.

2. The picture making apparatus according to claim 1, further comprising a printer that prints the picture made by the picture making apparatus.

3. The picture making apparatus according to claim 1, wherein the pictures are faces and said occupation area designation means is provided with an occupation area stipulation means by face type which predetermines the balance among the occupation areas of respective parts corresponding to the face type.

4. The picture making apparatus according to claim 1, wherein said picture making apparatus is further provided with an occupation area position adjustment means for adjusting the position of an occupation area of a part in the viewing area.

5. The picture making apparatus according to claim 1, wherein said size adjustment means changes a ratio of a length to a breadth of the occupation area.

6. The picture making apparatus according to claim 1, further comprising repositioning means for repositioning the selected image elements.

7. The picture making apparatus according to claim 6, wherein said repositioning means limits the repositioning to preclude distortions in the created picture.

8. The picture making apparatus according to claim 7, further comprising size adjusting means for adjusting the size of an image element.

9. The picture making apparatus according to claim 8, wherein at least one of the plurality of image elements has a mirror picture element and said apparatus further comprises paired operating selecting means for selecting one of paired or independent operation of said repositioning means and of said size adjusting means on the mirrored picture elements.

10. The picture making apparatus according to claim 1, wherein said first selecting means comprises:

first point specification means for specifying a point on said display; and a part discriminator that identifies the image element based on a relationship between the point and displayed positions of the image elements, wherein said second selecting means is activated to select one of the at least two different permutations of the image element identified by the part discriminator.

11. The picture making apparatus according to claim 10, wherein said second selecting means comprises:

a pattern display that displays on said display said at least two permutations of the identified image element;

second point specification means for specifying a one of the displayed at least two permutations; and change means for changing a current permutation of the image element to the permutation specified by said second point specification means.

12. The picture making apparatus according to claim 1, further comprising position change means for limiting the degrees of freedom for repositioning image elements.

13. The picture making apparatus according to claim 12, wherein said plurality of image elements includes a primary image element, a center line of said primary image element providing a basis for the degrees of freedom of movement, wherein a first group of image elements can't move relative to the center line, a second group elements move only along the center line, a third group of elements move transferse to the center line and a fourth group of elements move freely with respect to the center line.

14. The picture making apparatus according to claim 13, wherein the primary image element is a face outline and the first group includes the face outline and a hair style, the second group includes a nose and a mouth, and eyes and ears are included in one of the third and fourth groups.

15. The picture making apparatus according to claim 1, further comprising paired selecting means, wherein when a one of mirror image elements is operated on and pairing is selected by said paired selecting means, operations performed on the one mirror image element are mirrored in the other mirror image, and when pairing is not selected, operations performed on the one mirror image element are limited to that mirror image element.

16. The picture making apparatus according to claim 1, wherein said storage means further stores a plurality of preset type pictures and the apparatus further comprises third selecting means for selecting one of the plurality of preset type pictures.

17. The picture making apparatus according to claim 16, further comprising fourth selecting means for selecting between at least two procedures for creating a face from the procedures consisting of creating an original picture, altering a previously created picture, and altering one of the plurality of preset type pictures.

18. The picture making apparatus according to claim 17, further comprising return means for undoing alterations and returning to a picture prior to the alterations being applied when operating in one of the procedures of altering a previously created picture and altering one of the plurality of present type pictures.

19. The picture making apparatus according to claim 16, wherein each one of the plurality of preset type pictures is a composite of a predetermined permutation of each image element.

20. The picture making apparatus according to claim 1, wherein each image element is a feature of human face and the permutations comprise different appearances of the feature.

21. The picture making apparatus according to claim 1, wherein said display further comprises an output area for displaying the complete picture as it will appear when printed on a print medium.

22. The picture making apparatus according to claim 21, wherein the printer is a tape printer and the print medium is a tape.

23. The picture making apparatus according to claim 1, further comprising:

conversion means for converting the picture pattern to bit-map data;

changing range extraction means for extracting the range of the permutation of the selected image element being operated upon;

a partial conversion means to convert only the extracted range to new bit-map data; and combining means for combining the bit-map data of the conversion means and partial conversion means to create bit-map data for a changed picture.

24. The picture making apparatus according to claim 1, further comprising change means for changing a first state of a picture created by said picture making apparatus to a second state based upon selection of a state using said change means.

25. The picture making apparatus according to claim 24, wherein the picture is a face, the first state is one of a child and an adult and the second state is the other of the child and adult.

26. A storage medium readable by an electronic data processing unit for a picture making apparatus, comprising:

- a main program controlling operation of the picture making apparatus;
- a display program controlling a viewing area with a predetermined size;
- a memory area storing a plurality of image elements as outline data, each image element having at least two different permutations;
- a first selection program controlling selection of one of the plurality of image elements stored in the memory area;
- a second selection program controlling selection of one of the at least two different permutations when the image element has been selected;
- an occupation area designation program designating occupation areas for each image element of the plurality of image elements in the viewing area;
- a first scaling program scaling each selected permutation of each selected element to the designated occupation area of the viewing area in the form of outline data; and
- a combining program that combines the selected permutation selected by the second selection program of each element selected by the first selection program for viewing as a complete picture in the viewing area, wherein said storage medium is further provided with a size adjustment program for an occupation area for adjusting the size of the occupation area.

* * * * *